(12) United States Patent
Sakakibara et al.

(10) Patent No.: US 7,045,989 B2
(45) Date of Patent: May 16, 2006

(54) METHODS AND APPARATUS FOR MANAGING A PLURALITY OF CHARGING DEVICES VIA A NETWORK

(75) Inventors: Kazuyuki Sakakibara, Anjo (JP); Katsutoshi Tanaka, Anjo (JP)

(73) Assignee: Makita Corporation, Anjo (JP)

( * ) Notice: Subject to any disclaimer, the term of this patent is extended or adjusted under 35 U.S.C. 154(b) by 525 days.

(21) Appl. No.: 10/125,665

(22) Filed: Apr. 17, 2002

(65) Prior Publication Data

US 2002/0156537 A1   Oct. 24, 2002

(30) Foreign Application Priority Data

Apr. 18, 2001   (JP) .............................. 2001-119181

(51) Int. Cl.
*H02J 7/00* (2006.01)
(52) U.S. Cl. ...................................... 320/106; 320/110
(58) Field of Classification Search ................ 320/106, 320/110, 125, 127, 128, 132, 134, 136, 2, 320/6, 12, 15, 19, 22
See application file for complete search history.

(56) References Cited

U.S. PATENT DOCUMENTS

| | | | | |
|---|---|---|---|---|
| 4,951,308 A | * | 8/1990 | Bishop et al. ........... | 379/91.01 |
| 4,961,043 A | * | 10/1990 | Koenck ..................... | 320/132 |
| 5,548,200 A | | 8/1996 | Nor et al. .................... | 320/27 |
| 5,694,019 A | * | 12/1997 | Uchida et al. ............... | 320/106 |
| 5,803,215 A | | 9/1998 | Henze et al. .................. | 191/2 |
| 5,951,229 A | * | 9/1999 | Hammerslag ............... | 414/398 |

FOREIGN PATENT DOCUMENTS

| | | |
|---|---|---|
| EP | 0 693 813 A1 | 1/1996 |
| JP | 2000294298 | 10/2000 |

OTHER PUBLICATIONS

European Search Report, Nov. 13, 2003.

* cited by examiner

*Primary Examiner*—Donald Sparks
*Assistant Examiner*—Lawrence Luk
(74) *Attorney, Agent, or Firm*—Orrick, Herrington & Sutcliffe LLP

(57) ABSTRACT

A plurality of charging devices 30 may be connected to a computer 10, 110 via a network 60. When computer 10 receives chewing information from a charging device 30 before performing a charging operation, computer 10 may compute the optimal charging period based upon the charging information. Parameters defining the optimal charging period may be transmitted to the respective charging devices 30. Each charging device 30 may perform the battery charging operation based upon the transmitted parameters. Thus, a network system can manage and control the charging operations for the plurality of charging devices in order to optimize charging period, optimize the number of charging devices 30 and battery packs 50 in use and maximize battery life.

22 Claims, 25 Drawing Sheets

FIG. 25
(A)
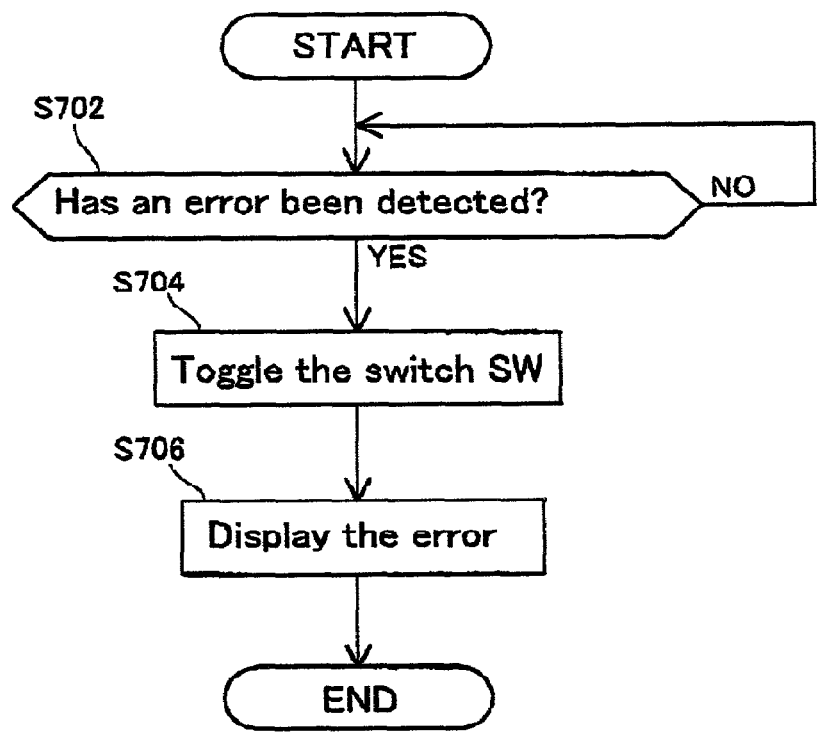
(B)
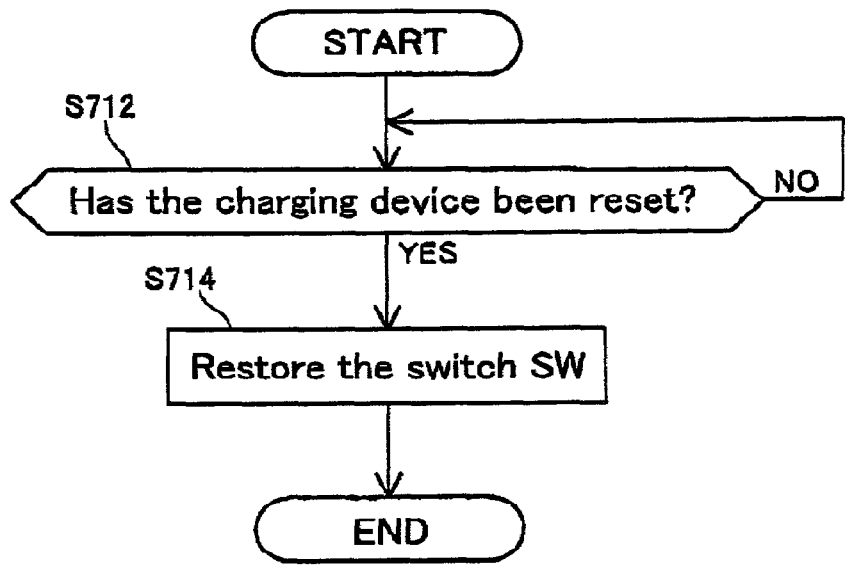

METHODS AND APPARATUS FOR MANAGING A PLURALITY OF CHARGING DEVICES VIA A NETWORK

The present application claims priority to Japanese patent application serial number 2001-119181, which was filed Apr. 18, 2001, the contents of which are hereby incorporated by reference.

Technical Field

The present invention relates to methods and apparatus for managing a plurality of charging devices by connecting the plurality of charging devices to a network. Such charging devices can be utilized to charge rechargeable battery packs that may be, e.g., utilized with power tools.

Background Art

Battery-powered power tools (or cordless power tools) may be advantageously utilized in automobile assembly lines and other types of manufacturing assembly lines. In an assembly line, multiple batteries (battery packs) may be utilized for each power tool. When a battery has been drained by the use of the power tool, the discharged battery is replaced with a charged battery and the assembly work is continued. The discharged battery is mounted in a charger (charging device) and recharged. At the same time, another (charged) battery is mounted on the power tool and the operator can continue to utilize the same power tool. Thus, the assembly work can be continued with the same power tool while simultaneously charging a discharged battery.

Battery life may vary widely depending on the method utilized to recharge the battery. In general, rapidly charging a battery in a relatively short period of time by applying a relatively large charging current will shorten the battery life. For example, large charging current may cause the temperature of the battery to excessively increase during recharging, thereby permanently damaging the battery. On the other hand, slowly charging a battery over a relatively long period by applying a relatively small charging current may prolong the battery life. However, the operator may be inconvenienced by having to wait a long time for the battery to recharge.

As an example, new, fully charged battery may, e.g., tighten 500 screws before being completely discharged. However, after the battery has been repeatedly discharged and recharged, the number of screws that can be tightened before the battery runs out will typically decrease. For example, the battery may only tighten 300 screws before running out of energy. In many assembly lines, when the number of screws that can be tightened before the battery runs out declines to a predetermined value, e.g., 300, the battery is considered to have expired and will be replaced. The number of cycles of discharging and charging until the number of screws that can be tightened before the battery runs out declines to be predetermined value may vary widely depending on the method utilized to recharge the battery. In assembly lines, batteries are typically recharged in a relatively short period of time by applying a relatively large charging current in order to minimize the number of batteries that are being recharged at one time. However, such charging methods ordinarily will shorten the battery life. Although charging a battery over a longer period by applying a smaller charging current will prolong the battery life, the long period necessary for charging the battery will naturally increase the number of batteries needed to continuously perform the assembly work.

If a rechargeable (secondary) battery, such as a nickel cadmium battery or a nickel hydride battery, is repeatedly charged before its capacity has been fully used, "memory effects" typically will reduce the fully chargeable battery capacity. As a result the number of screws that can be tightened before the battery runs out will decrease. Naturally, a battery having a reduced fully chargeable capacity will reduce work efficiency and increase the number of batteries that will be necessary in order to continuously perform the work. If the fully chargeable battery capacity has been reduced due to memory effect, the fully chargeable battery capacity can be increased (restored) by completely discharging the energy stored in the rechargeable battery. This process is known as a "refresh operation." Some known charging devices include a refresh circuit for completely discharging the energy stored in the rechargeable battery before the battery is recharged. However, in a situation in which a plurality of batteries are being recharged by a plurality of charging devices (e.g., in an assembly line), it has not been possible to individually manage or control the charging history of each battery. Consequently, it has not been possible to refresh the batteries at an optimal timing. Moreover, if a battery is repeatedly refreshed at an inappropriate timing, the battery will be overly or excessively discharged, thereby shortening, the usable life of the battery.

Thus, memory effects will be caused by repeatedly recharging a rechargeable battery before the battery has been fully discharged, thereby reducing fully chargeable capacity. On the other hand, discharging the battery overly or excessively may irreparably damage the battery. Further, if the battery is rapidly charged using large charging current, the battery may be irreparably damaged by excessive heat generated during the charging operation. However, if the battery is slowly charged using small charging current in order to avoid this problem, the operator generally must have a large number of batteries available for the work operation. Naturally, a large number of charging devices also would be required, which will increase the operating costs of using battery-powered devices and tools.

SUMMARY OF THE INVENTION

It is, accordingly, one object of the present teachings to overcome at least one such problem of the prior art. For example, in one aspect of the present teachings, it is possible to individually manage the charging cycles of a plurality of batteries in a time efficient manner without damaging the batteries using appropriate charging current and without generating memory effects, Thus, in this aspect of the present teachings, battery life can be prolonged and optimal charging speed can be utilized. In another aspect of the present teachings, the optimal number of batteries and charging devices for a given usage environment can be accurately computed.

In another aspect of the present teachings, a plurality of charging devices may be connected to a network and the charging devices may be controlled by a computer processor. In this case, when each charging device performs a charging operation, the charging device preferably send charging information to the computer processor via the network. Based upon this charging information, the computer processor preferably transmits control information via the network. Each charging device operates using this control information, which was received via the network. Thus, a single computer processor can control the charging operation of a plurality of charging devices.

In another aspect of the present teachings, when each charging device is about to perform a charging operation, charging information may be transmitted to the computer processor via the network. Based upon this charging information, the computer processor may compute an optimal charging speed and transmit an instruction concerning the optimal charging speed to the appropriate charging device via the network. Based upon the instruction received via the network, the charging device selects appropriate charging parameters, and performs the charging operation using the selected parameters. According to this aspect, the charging operation can be performed within the optimal amount of time, thereby enabling efficient use of multiple batteries or battery packs.

In another aspect of the present teachings, the computer processor preferably determines the optimal charging speed based upon the charging information received from a charging device, and transmits the parameters for defining the optimal charging speed to the charging device via the network. The charging device then performs the battery charging operation based upon the parameters received via the network. According to this method, the charging operation can be performed within an optimal amount of time, thereby enabling efficient use of multiple batteries or battery packs.

In another aspect of the present teachings, the computer processor may determine the optimal charging speed based upon the charging information received from each charging device, and directly control the individual charging device. According to this aspect, the charging operation can be performed for the optimal amount of time, thereby enabling efficient use of multiple batteries or battery packs. Moreover, because the charging devices are not required to execute complex control programs, the charging devices can be manufactured relatively inexpensively.

In another aspect of the present teachings, a plurality of charging devices may be classified into one or more groups according to the usage environment of each charging device. Based upon the charging information sent from each charging device, the computer processor preferably recognizes the group to which the charging device belongs and determines the optimal charging speed for that group. According to this method, one optimal charging speed can be used for each group of charging devices having a common usage environment, thereby enabling efficient use of multiple batteries or battery packs.

In another aspect of the present teachings, when each charging device is about to perform a charging operation, the charging device may transmit an identification information for the battery to the computer via the network. Based upon the received battery identification information, the computer processor determines whether or not a refresh operation is required for that battery. If the computer processor determines that a refresh operation is required for that battery, the computer processor transmits instructions to the charging device indicating that the battery should be refreshed before being recharged again. When the charging device receives the refresh instruction, the charging device may either perform the refresh operation (if the charging device includes a refresh current) or notify the operator to remove the battery and perform the refresh operation using another device. According to this aspect, batteries can be refreshed at an appropriate time, thereby enabling efficient use of multiple batteries or battery packs. The refreshing operation will discharge the remaining energy stored in a rechargeable battery before recharging and thus, restore the fully chargeable capacity of the rechargeable battery.

In another aspect of the present teachings, when each charging device is about to perform a charging operation, the charging device may transmit charging information to the computer processor. Based upon this charging information, the computer processor may compute and then display the optimal number of batteries required to efficiently perform continuous work for the assembly line.

In another aspect of the present teachings, when each charging device is about to perform a charging operation, the charging device may transmit charging information to the computer processor. Based upon this charging information, the computer processor may compute and display the optimal number of charging devices required to efficiently perform continuous work for the assembly line.

These aspects and features may be utilized singularly or in combination in order to provide improved charging techniques for rechargeable batter packs and techniques for managing the charging operations for a plurality of batteries and charging devices. In addition, other objects, features and advantages of the present teachings will be readily understood after reading the following detailed description together with the accompanying drawings and the claims. Of course, the additional features and aspects disclosed herein also may be utilize singularly or in combination with the above-described aspects and features.

BRIEF EXPLANATION OF THE DRAWINGS

FIGS. 25(A) and (B) show a representative error processing method that may be utilized with the fourth representative arrangement shown in FIGS. 23 and 24.

DETAILED DESCRIPTION OF THE INVENTION

Figure 1:
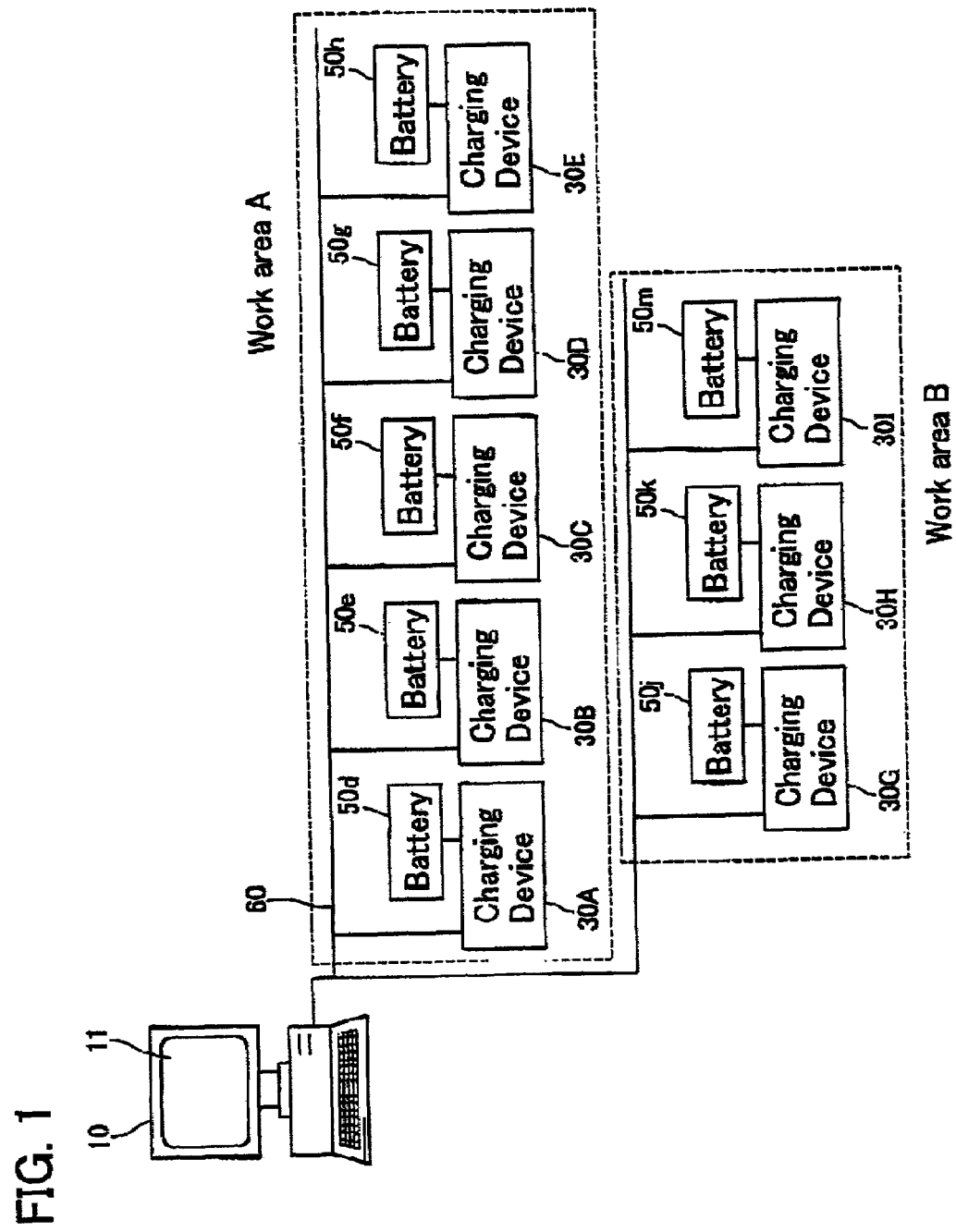
FIG. 1 shows a first representative arrangement for managing a plurality of charging devices.

In one embodiment of the present teachings, methods are taught for managing a plurality of charging devices that are connected to a computer via a network. For example, a battery pack may be mounted on one of the plurality of charging devices connected to the computer via the network. Then, the charging device having the mounted battery pack thereon preferably generates charging information based upon the mounted battery pack. The charging information may be transmitted from the charging device to the computer via the network. Then, the computer may generate charging control instructions based upon the charging information. Further, the computer may then transmit the charging control instructions to the charging device via the network. Thereafter, the charging device may charge the mounted battery pack based upon the received charging control instructions.

In optional embodiments of these methods, the charging control information may include information that indicates the result of the selection made by the computer from the available options for optimal charging based upon the charging information. In addition or in the alternative, the charging control instructions may include parameters for selecting an optimal charging-current value. In addition or in the alternative, the charge control instructions may include a charge control map that includes optimal charging-current values. In addition or in the alternative, the computer may directly control the charging operation performed by the charging devices using the charge control instructions. In addition or in the alternative, the plurality of charging devices may be classified into at least two different groups according to the usage environment for the respective charging device, and the charge control instructions may differ for each group.

Another method for managing a plurality of charging devices that are connected to a computer via a network may include mounting a battery park on one of the plurality of charging devices connected to the computer via the network. The charging device having the mounted battery pack may generate battery identification information based upon the mounted battery pack. The battery identification information may be transmitted from the charging device to the computer via the network. Then, the computer may determine whether the mounted battery pack requires a refresh operation based upon the transmitted battery identification information. When the computer determines that the mounted battery pack requires a refresh operation, a refresh instruction may be transmitted via the network to the charging device having the mounted battery pack. Thereafter, the charging device may inform an operator to remove the mounted battery pack from the charging device and perform the refresh operation on the removed battery pack. In the alternative, the charging device may perform the refresh operation before beginning the recharging operation. In this case, it is not necessary to inform the operator.

Another method for managing a plurality of charging devices that are connected to a computer via a network may include transmitting charging information from each charging device to the computer via the network. The computer may then determine the total number of charging devices and battery packs currently in operation. Further, an optimal number of charging devices to be utilized based upon the charging information may be calculated and the operator may be notified of the optimal number of charging devices. In addition or in the alterative, the optimal number of battery packs to be utilized based upon the charging information may be calculated in this method and the operator may be notified of the optimal number of battery packs, as well.

Another method for managing a plurality of charging devices that are connected to a computer via a network may include transmitting charging information from each charging device to the computer via the network. The charging devices may each include switches and power source that allow the various power sources to be interconnected. If the computer determines there is an error in one of the charging devices, the computer may cause one or more of the switches to be actuated and therefore, re-route current along a network interconnecting the various power sources.

As noted below, each of these methods may be combined in ways that are not specifically enumerated in order to provide additional methods. Naturally, various apparatus also may be constructed in order to perform the various methods described herein.

For example, in another embodiment of the present teachings, apparatus are taught for managing a plurality of charging devices that are connected to a computer via a network. Thus, each of the plurality of charging devices preferably includes a battery pack mount for receiving a battery pack that will be recharged using the charging device. Further, the respective charging devices preferably include means for generating charging information based upon the mounted battery pack and means for transmitting the charging information from the charging device to the computer via the network. The computer may preferably include means (e.g., a processor) for generating charging control instructions based upon the charging information and means for transmitting the charging control instructions to the charging device(s) via the network. Naturally, the respective charging devices may preferably include means for receiving the charging control instructions transmitted by the computer and means for charging the mounted battery pack based upon the received charging control instructions.

As noted above, in these apparatus embodiments as well, the charging control information may include information that indicates the result of the section made by the computer from the available options for optimal charging based upon the charging information. Further, the charging control instructions may include parameters for selecting an optimal charging-current value. In addition or in the alternative, the charge control instructions may include a charge control map that includes optimal charging current values. In addition or in the alternative, the computer may include means (e.g., a processor) for directly controlling the charging operation performed by the charging devices using the charge control instructions. In addition or in the alternative, the plurality of charging devices may be classified into at least two different groups according to the usage environment for the respective charging devices, and the charge control instructions may differ for each group.

Another apparatus for managing a plurality of charging devices that connected to a computer via a network may include means for mounting a battery park disposed on each of the plurality of charging devices. The charging devices may include means (e.g., a processor) for generating battery identification information based upon the mounted battery pack and means for transmitting the battery identification information from the charging device to the computer via the network. The computer may include means (e.g., a processor) for determining whether the mounted battery pack requires a refresh operation based upon the transmitted battery identification information and means for transmitting a refresh instruction to the charging device via the network when the computer determines that the mounted battery pack requires a refresh operation. The charging device may include means (e.g., a display, a buzzer, a light, etc.) for informing an operator to remove the mounted battery pack from the charging device aid perform the refresh operation on the removed battery pack. In the alternative, the charge device may include means for performing the refresh operation.

Another apparatus for managing a plurality of charging devices that are connected to a computer via a network may include means for transmitting charging information from each charging device to the computer via the network. The computer may include means (e.g., a processor) for determining the total number of charging devices and battery packs currently in operation. Further, the computer may include means (e.g., a processor) for calculating an optimal number of charging devices to be utilized based upon the charging information and means (e.g., a display) for informing an operator of the optimal number of charging devices. In addition or in the alternative, the computer may include means (e.g., a processor) for determining an optimal number of battery packs to be utilized based upon the charging information and means (e.g., a display) for informing the operator of the optimal number of battery packs, as well.

As noted above and below, each of these apparatus may be combined in ways that are not specifically enumerated in order to provide additional useful apparatus.

In another embodiment of the present teachings, apparatus are taught that may include a plurality of charging devices. Each charging device may include a battery pack mount arranged and constructed to receive a battery pack. Each charging device also may include means for supplying a charging current to the mounted battery pack. Further, each charging device may include means (e.g., a processor) for generating charging information based upon a mounted battery pack.

A computer may communicate with the plurality of charging devices via a network. The computer may include means (e.g., a processor) for receiving the charging information from the charging device(s) and means for generating charging control instructions based upon the charging information. The computer may also include means for transmitting the charging control instructions to the charging devices via the network. The charging devices preferably include means (e.g., a processor) for charging the mounted battery pack based upon the received charging control instructions.

In another embodiment, the computer may include means and/or a stored program for selecting an optimal charging control program based upon the charging information. In addition or in the alternative, the computer may include means and/or a stored program for generating parameters for selecting an optimal charging-current value. In addition or in the alternative, the computer may include mean and/or a stored program for generating a charge control map that includes optimal charging-current values. In addition or in the alternative, the computer may include means and/or a stored program for directly controlling the charging operation performed by the charging devices using the charge control instructions. As noted above, the plurality of charging devices may be classified into at least two different groups according to the usage environment for the respective charging devices, and the charge control instructions may differ for each group.

In another embodiment of the present teachings, apparatus are taught that may include a plurality of charging devices. Each charging device may include a battery pack mount arranged and constructed to receive a battery pack and means for supplying a charging current to the mounted battery pack. Further, each charging device may include means for generating battery identification information based upon a mounted battery pack.

A computer may communicate with the plurality of charging devices via a network. The computer may include means (e.g., a processor) for receiving the battery identification information from the charging device and determining whether a refresh operation is required based upon the battery identification information. The computer preferably transmits a refresh instruction to the charging devices via the network when a refresh operation is indicated. Optionally, means (e.g., a display, a light, a buzzer) may be provided to inform an operator to remove the mounted battery pack from the charging device and perform the refresh operation on the removed battery pack upon receipt of the refresh instruction. In the alternative, the charging devices may include means for performing the refresh operation upon receipt of the refresh instruction.

In another embodiment, a computer may communicate with the plurality of charging devices via a network and include means and/or a stored program for (a) determining the total number of charging devices and battery packs currently in operation, (b) calculating an optimal number of charging devices to be utilized based upon the charging information and (c) notifying an operation of the optimal number of charging devices. In addition or in the alterative, the computer may include means and/or a stored program for (a) determining the total number of charging devices and battery packs currently in operation, (b) calculating an optimal number of battery packs to be utilized based upon the charging information and (c) notifying an operator of the optimal number of battery packs.

In another embodiment of the present teachings, charging devices may include a battery pack mount having terminals for connecting to a battery pack and means for applying charging current to the battery pack via the terminals. Further, a communication port may be provided on the charging device in order to permit information to be communicated from the charging device to a computer via a network. Optionally, the charging device may further include a processor that can generate an instruction to begin a battery charging operation upon receiving a charging start signal from the computer via the network. The processor optionally also may read identification information and battery voltage from a battery pack mounted in the battery pack mount and transmit said identification information and battery voltage to the computer via the network. In another optional embodiment the charging device may include a memory that stores at least one charge control map. The processor may control the current supplying means based upon the at least one charge control map. In another optional embodiment, the processor may receive at least one charge control map from the computer via the network and store the received charge control map in the memory.

Each of the additional features and method steps disclosed above and below may be utilized separately or in conjunction with other features, elements and method steps to provide improved battery charging techniques and techniques for managing the recharging of a plurality of battery packs using a plurality of battery charging devices. Detailed representative examples of the present teachings, which examples will be described below, utilize many of those additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures. Of course, features and steps described in this specification and in the dependent claims may be combined in ways that are not specifically enumerated in order to obtain other usual and novel embodiments of the present teachings and the present inventor expressly contemplates such additional combinations.

First Representative Embodiment

FIG. 1 shows a first representative arrangement for managing a plurality of charging devices 30A, 30B, 30C, 30D, 30E, 30G, 30H, and 30I, which charging devices may be advantageously utilized in an automobile assembly line. These charging devices may be connected to a single computer 10 via a network 60, and may be centrally managed by computer 10. In this representative embodiment, the assembly line is divided into two work areas A and B, although additional divisions are naturally possible according to the present teachings. For example, the frame of the automobile may be assembled in work area A and the engine may be installed in work area B. The load on the power tools may be less in work area A than in work area B. In this representative embodiment, computer 10 differentiates between the charging devices 30A, 30B, 30C, 30D, and 30E used in work area A and charging devices 30G, 30H, and 30I used in work area B, and adjusts the respective charging speeds.

Figure 2:
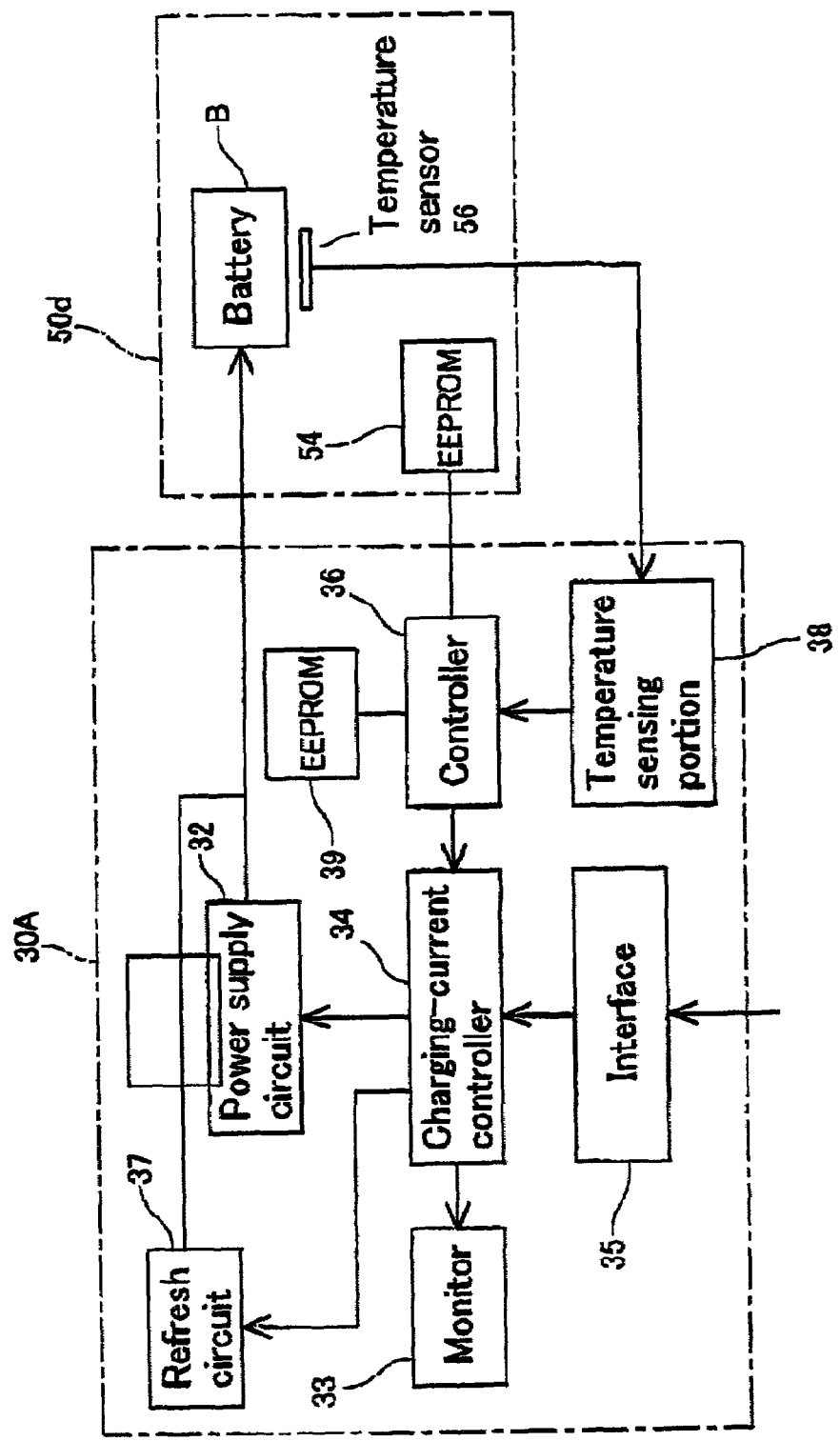
FIG. 2 shows block diagrams of a first representative charging device and a first representative battery pack.

Each of the charging devices and battery packs may be substantially identical. Furthers the battery packs are preferably designed in order to be utilized with power tools, although naturally other applications of the present teachings with respect to battery operated devices are contemplated. FIG. 2 shows a block diagram of representative charging device 30A and representative battery pack 50d according to the first representative embodiment. Charging device 30A may include a temperature sensing portion 38, EEPROM 39, controller (processor) 36, charging-current controller 34, monitor (display) 33, power supply circuit 32, refresh circuit 37, and interface (I/O) 35. Temperature sensing portion 38 calculates the battery temperature based upon the output signal(s) from temperature sensor (thermistor) 56, which may be installed within battery pack 50d. EEPROM 39 may store identification information (A) for charging device 30A and a map or look up table (LUT) for selecting the amount of charging current that will be supplied to the battery B.

Controller 36 may calculate a battery temperature increase rate by differentiating the battery temperature calculated by the temperature sensing portion 38 over time. Controller 36 may calculate the amount of current that will be supplied to the battery, which current value preferably prevents the battery temperature from increasing excessively. For example, controller 36 may obtain the appropriate current value from the map (LUT) using the present (detected) battery temperature and the battery temperature increases rate as indices to the map (LUT). Controller 36 may then transmit a signal to charging current controller 34, which signal represents the appropriate current value from the map (LUT). Charging-current controller 34 then controls the power supply circuit 32 in order to adjust the amount of current supplied to battery B based upon the signal from controller 36.

Monitor 33 may be utilized to display various types of information. Further, refresh circuit 37 may restore the fully chargeable capacity to battery B by completely, or substantially completely, discharging battery B before recharging battery B. Interface 35 may transmit communications to and receive communications from computer 10 via the network 60.

Battery pack 50d may preferably include one or more nickel hydride batteries B, although naturally the present teachings are applicable to a wide variety of battery technologies, including nickel cadmium batteries. A temperature sensor (thermistor) 56 may sense the temperature of the nickel hydride batteries and provide the detected battery temperature information to temperature sensing portion 38. EEPROM 54 may store identification information (d) for identifying battery pack 50d.

A representative map (LUT) that may be utilized to select appropriate charging current values according to the present teachings will be described in further detail with reference to FIG. 3. Generally speaking, by increasing the amount of charging current, the charging period can be shortened. However, large charging current may result in a rather steep battery temperature increase rate, which might cause the batteries to reach excessive temperatures and thus, shorten the battery life. On the other hand, by decreasing the amount of charging current, the charging period will increase. However, the battery life will be prolonged if the battery temperature never reaches excessive temperatures. For example, a nickel metal hydride battery may be permanently damaged if the battery temperature exceeds about 60° C.

The battery temperature increase per unit time (i.e., the battery temperature increase rate) will vary greatly depending upon the amount of charging current supplied to the battery and the charge state of the battery. Therefore, the first representative charging device preferably determines the battery status using the detected battery temperature and the battery temperature increase rate. Then, the charging device preferably applies the largest possible charging current that will not cause the battery temperature to rise excessively. By using such a charging current, the battery life will be prolonged and the battery can be charged in the shortest amount of time without damaging the battery. This optimal charging-current value does not remain constant during the charging operation and instead varies over time (i.e., during the course of recharging the battery). In other words, while the battery is being charged, the charging current value is varied (adjusted) in accordance with the state of the battery (e.g., battery temperature, battery temperature increase rate, etc.).

When the battery temperature is relatively high, a relatively small charging current is preferably supplied to the battery. On the other hand, when the battery temperature is relatively low, a relatively large charging current may be supplied to the battery. Furthermore, when the battery temperature increase rate is relatively large, a relatively small charging current is preferably supplied to the battery. On the other hand, when the battery temperature increase rate is relatively small, a relatively large charging current may be supplied to the battery.

Figure 3:
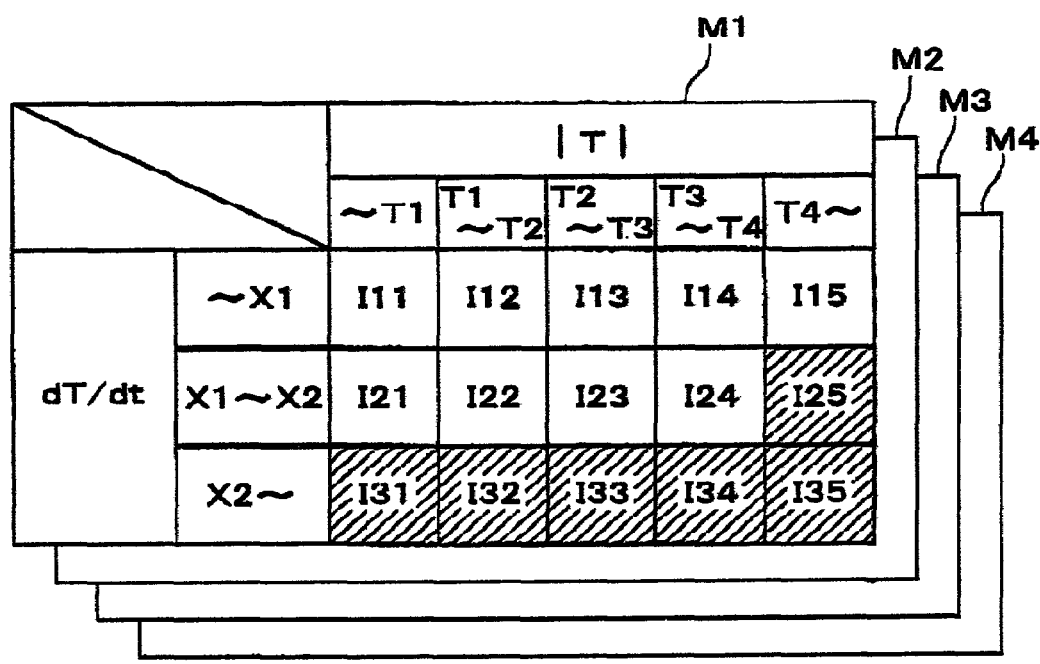
FIG. 3 shows a representative set of maps or look up tables (LUTs) that may be stored in an EEPROM of the charging device.

Maps M1, M2, M3, and M4 as shown in FIG. 3 may store optimal charging current according to these considerations. In FIG. 3, the horizontal axis indicates the present battery (absolute) temperature T and the vertical axis indicates the battery temperature increase rate (dT/dt). The size of the maximum current that can be supplied within each range without causing an excessive rise of the battery temperature is indicated at the intersecting point between the present battery temperature T and the battery temperature increase rate dT/dt.

Relatively small charging currents are identified in the area (i.e., in the lower right area of the map) in which the battery temperature T is relatively high (T3 and T4) and the battery temperature increase rate dT/dt is relatively large (X2). Medium-level currents are identified in the area (i.e., in the upper right area of the map) in which the battery temperature T is relatively high (T3 and T4), but the battery temperature increase rate dT/dt is relatively small (X1) as well as in the area (i.e., the lower left area of the map) in which the battery temperature T is relatively low (T1 and T2) and the battery temperature increase rate dT/dt is relatively large X2). Finally, a relatively large charging current may be supplied to the battery B when the battery temperature T is relatively low (T1) and the battery temperature increase rate dT/dt is relatively small (X1) (i.e., the upper left area of the map), Maps M1, M2, M3, and M4 may represent charging current control maps for completing the battery charging operation within 20, 25, 30, and 40 minutes, respectively. If rapid charging is used, a reduction in battery life cannot be avoided. That is, if the battery B is repeatedly charged according to map M1 (i.e., 20 minute charging), the battery life will be shorter than if the battery B is repeatedly charged according to map M4 (i.e., 40 minute charging). Given a desired charging period of 20 minutes, Map M1 identifies charging currents that will be least likely to shorten battery life, but will still complete the charging operation within 20 minutes.

When the battery will be charged, one map M1, M2, M3, or M4 is retrieved according to the desired charging speed. Then, the present battery temperature T and the battery temperature increase rate dT/dt are utilized as indices or parameters in order to determine the optimal charging current for each particular battery condition. For example, if the battery temperature is between T3 and T4 and the battery temperature increase rate is between X1 and X2, the current value I24 will be utilized in order to complete charging for 20 minutes.

During a charging operation, the charging current will vary seemingly at random based upon the changes in the present battery temperature and the present battery temperature increase rate. For example, if the battery temperature becomes relatively high or the battery temperature increase rate becomes large, a small charging current will be selected and supplied to the battery B. However, when the charging current decreases, the battery temperature increase rate will become smaller. Thereafter, a larger charging current can be selected again. Thus, the charging-current values may appear to randomly vary between large and small current values.

When the battery approaches a fully charged state, the battery temperature increase rate typically increases rapidly, even if only a small current is being supplied to the battery. Thus, the battery temperature increase rate may remain relatively large, even when the charging current is reduced. Consequently, when the battery approaches a fully charged state, the probability increases that area I25, I31, I32, I33, I34, or I35 in the shaded area of the map of FIG. 3 will be selected. Further, when areas I31, I32, I33, I34, and I35, where the battery temperature increase rate is large, and area I25, where the temperature is high and the battery temperature increase rate is medium, are selected at a relatively high frequency, the charging operation may be considered to be completed and can be stopped.

As noted above, charging device 30A preferably stores maps M1 through M4 in EEPROM 39. Computer 10 then selects the map to be used by evaluating the usage conditions in work area A where charging device 30A is being used. Then, charging device 30A selects the map according to this specification and completes the charging operation within the optimal amount of time.

Figure 4:
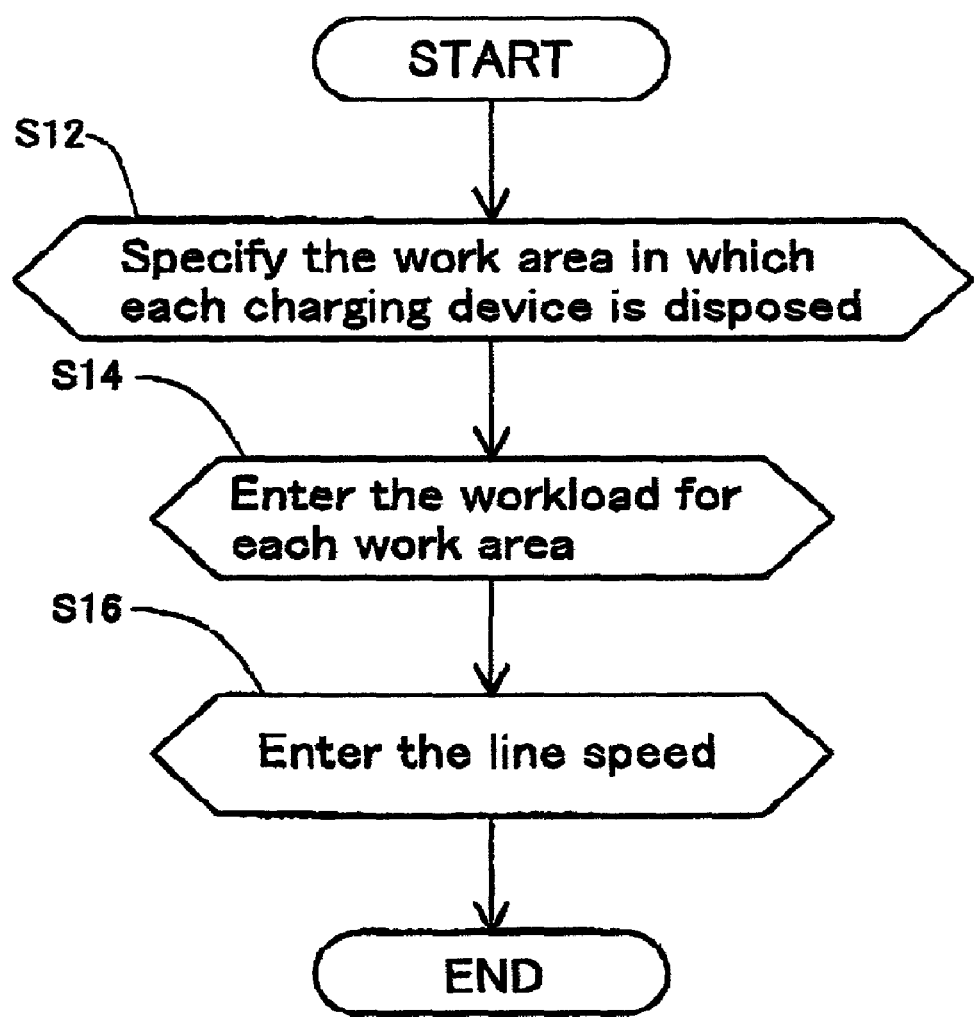
FIG. 4 is a flowchart showing a representative process for initializing the computer processor.

Representative programs, which may be executed by computer 10 and charging device 30A in order to manage a plurality of charging devices, will now be explained. First, the initial settings for computer 10 will be explained with reference to FIG. 4. The respective EEPROMs of charging devices 30A, 30B, 30C, 30D, 30E, 30G, 30H and 30I store respective identification information (A), (B), (C), D), (E), (G), (H), and (I), which information is utilized 80 identify each charging device. By reading the identification information (A), (B), (C), (D), (E), (G), (H), and (I) via network 60, computer 10 can recognize which charging devices 30A, 30B, 30C, 30D, 30E, 30G, 30H, and 30I are connected to computer 10 via network 60. The work area in which each charging device is located may first be input into computer 10 in step S12 shown in FIG. 4. For example, charging devices 30A, 30B, 30C, 30D, and 30E may be identified as belonging to work area A and charging devices 30G, 30H, and 30I may be identified as belonging to work area B.

Next, the workload for each work area may be entered in step S14. In the present example, we will continue to assume that the frame of the automobile is assembled in work area A and the engine is installed in work area B. In this case, work area A may be identified as a relatively light workload and work area B may be identified a relatively heavy workload. In this example, a relatively light workload is intended to mean that the battery charge dissipated per unit time is relatively small. In other words, the battery lasts longer, because the energy demands on the battery are relatively low. Then, the standard line speed may be entered for each work area (step S16). Naturally, as the line speed increases, the workload becomes heavier and vice versa.

Figure 5:
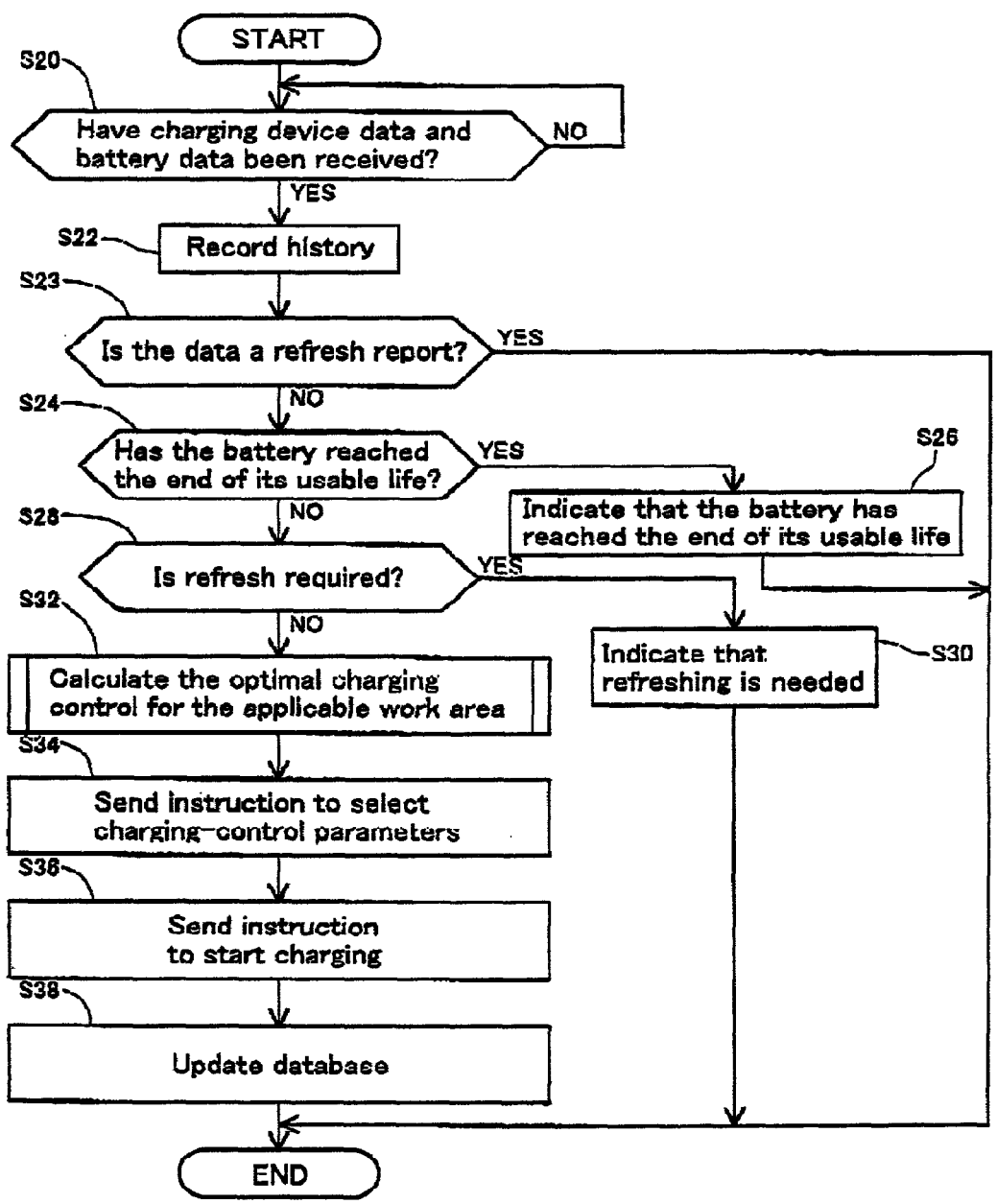
FIG. 5 is a flowchart showing a first representative control program that may be executed by the computer processor.
Figure 6:
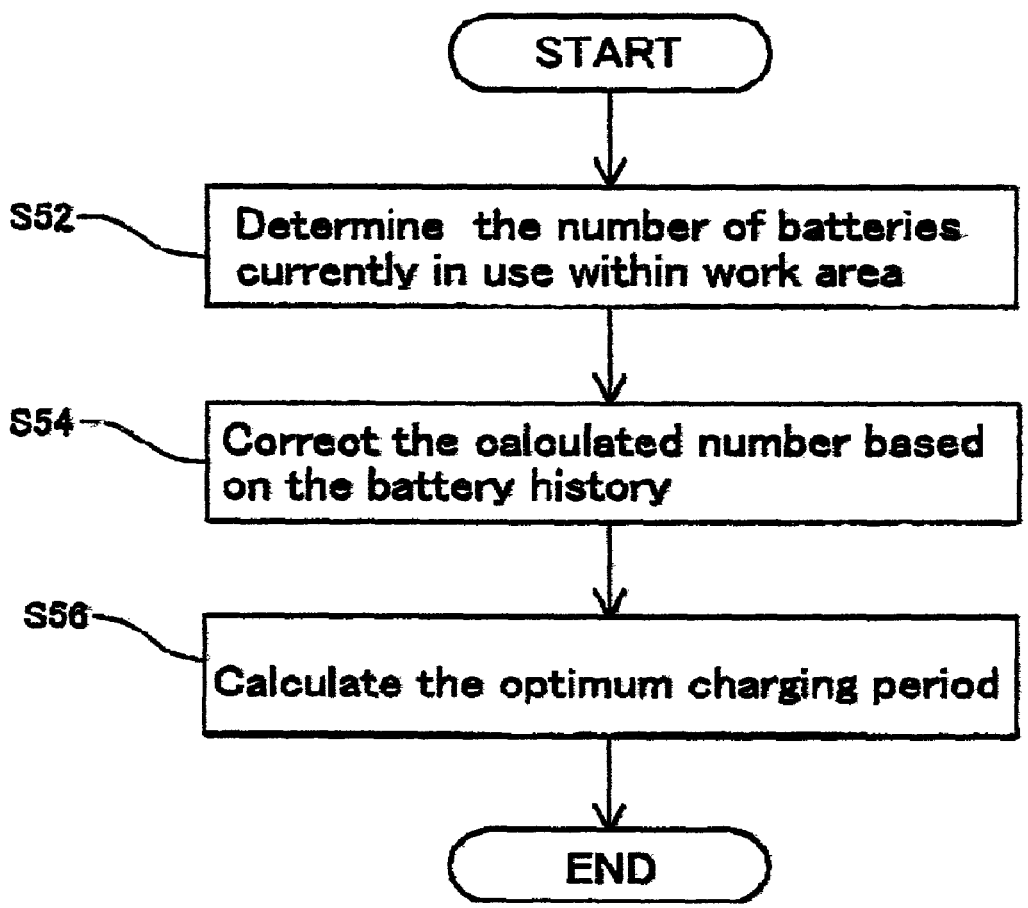
FIG. 6 is a flowchart showing a representative subroutine for the optimal charging control process shown in FIG. 5.

A representative control program executed by computer 10 for managing charging device 30A will be explained with reference to the flowcharts in FIGS. 5 and 6. When battery pack 50*d* is charged, the charging device identification information for charging device 30A is transmitted to computer 10, as well as identification information for the battery pack 50*d*, and the remaining battery capacity of the battery pack 50*d* at the start of the charging operation. These features will be further described below. In this example, charging device 30A in work area A shown in FIG. 1 will be utilized to charge battery pack 50*d*.

Computer 10 will first wait for data to be sent from a charging device (step S20). When battery pack 50*d* is set on charging device 30A, charging device 30A reads out the identification information (d) for battery pack 50*d*, including the remaining battery capacity of battery pack 50*d*. The identification information (d) read from battery pack 50*d*, identification information (A) for charging device 30A and the remaining battery capacity are transmitted to network 60 and received by computer 10 (step S20: Yes). In response, computer 10 records the fact that charging device 30A is about to begin charging battery pack 50*d*. If the received data is not refresh data which will be explained later (step S23: NO), computer 10 then determines whether or not battery park 50*d* has reached the end of its usable life based upon the stored history (step S24). For example, if battery pack 50*d* has been repeatedly charged and discharged up to a predetermined maximum charge/discharge cycles (step S24: Yes), computer 10 indicates the fact that battery pack 50*d* has reached the end of its usable life to charging device 30A and ends the process (step S26). Based upon this instruction from computer 10, charging device 30A will display on monitor 33 (see FIG. 2) that use of battery pack 50*d* should be discontinued.

The maximum number of charge/discharge cycles may optionally be determined based upon the charging speed. For example, battery pack 50*d* may be permitted to be recharged 500 times at 20-minute rapid charging (map M1), 556 times at 25-minute rapid charging (map M2), 625 times at 30-minute charging (map M3), and 714 times at 40-minute charging (map M4). Therefore, cash charging cycle can be counted by applying appropriate weights to the particular charging speed that is utilized in each case. A 20-minute rapid charging (map M1) may be given a weight of 1.0. A 25-minute rapid charging (map M2) may be given a weight of 0.9. A 30-minute charging (map M3) may be given a weight of 0.8. Finally, a 40-minute charging (map M4) may be given a weight of 0.7. Thus, when the total charging count reaches 500, the battery is considered to have reached the end of its usable life. Furthermore, the remaining battery capacity and the refresh count history for the battery also may be taken into consideration when determining whether the battery B has reached the end of its usable life.

Next, computer 10 determines whether or not battery pack 50*d* requires refreshing based upon the charging history and remaining battery capacity of battery pack 50*d* (step S28). For example, if battery pack 50*d* has been recharged five times without being refreshed and if the remaining battery capacity is at least 30% (step S28: Yes), computer 10 may instruct charging device 30A to refresh battery pack 50*d* and the end the process (step S30). Based upon this instruction from computer 10, charging device 30A may display on monitor 33 (see FIG. 2) that the battery pack must be refreshed, as will be further described below. When charging device 30A has finished refreshing battery pack 50*d* using refresh circuit 37, charging device 30A transmits data to computer 10 indicating that the refresh operation has been performed. When computer 10 receives this data (step S20; Yes), computer 10 makes a record indicating that battery pack 50*d* was refreshed (step S22) and ends the process (step S23: Yes).

Computer 10 may then calculate the optimal charging speed for work area A (step S32). This computation process will be explained with reference to the computation subroutine shown in FIG. 6. For example, computer 10 may determine the number of battery packs currently in use within work area A based upon the number of different battery pack identification information stored in the history (step S52). Next, a correction is made based upon the battery history (step S54). For example, a relatively new battery pack may be counted as 1, a battery pack that has been charged more than 200 times may be counted as 0.9, and a battery pack that has been charged more than 400 times may be counted as 0.8. Then, based upon the workload that was determined in step S14 and the line speed that was entered in step S16, the optimal charging speed is calculated (step S56). For example, if a relatively large number of batteries are available, a relatively long charging period may be utilized, because a battery shortage is not likely. On the other hand, if the workload is relatively heavy and/or the number of available batteries is relatively low, a short charging period may he utilized in order to ensure that recharged battery packs are available as needed. Furthermore, if the charging frequency is relatively high, a short charging period is preferably used. The following explanation will be based upon the assumption that the charging period is 20 minutes (map M1) for work area A As shown in FIG. 5, computer 10 then instructs charging device 30A to charge the battery according to map M1 (step S34) and instructs charging device 30A to begin charging (step S36). In response to this instruction, charging device 30A charges the battery so as to complete the charging operation within 20 minutes using map M1. Computer 10 may then update the database by adding data indicating that battery pack 50*d* was charged for 20 minutes and end the process (step S38).

Figure 7:
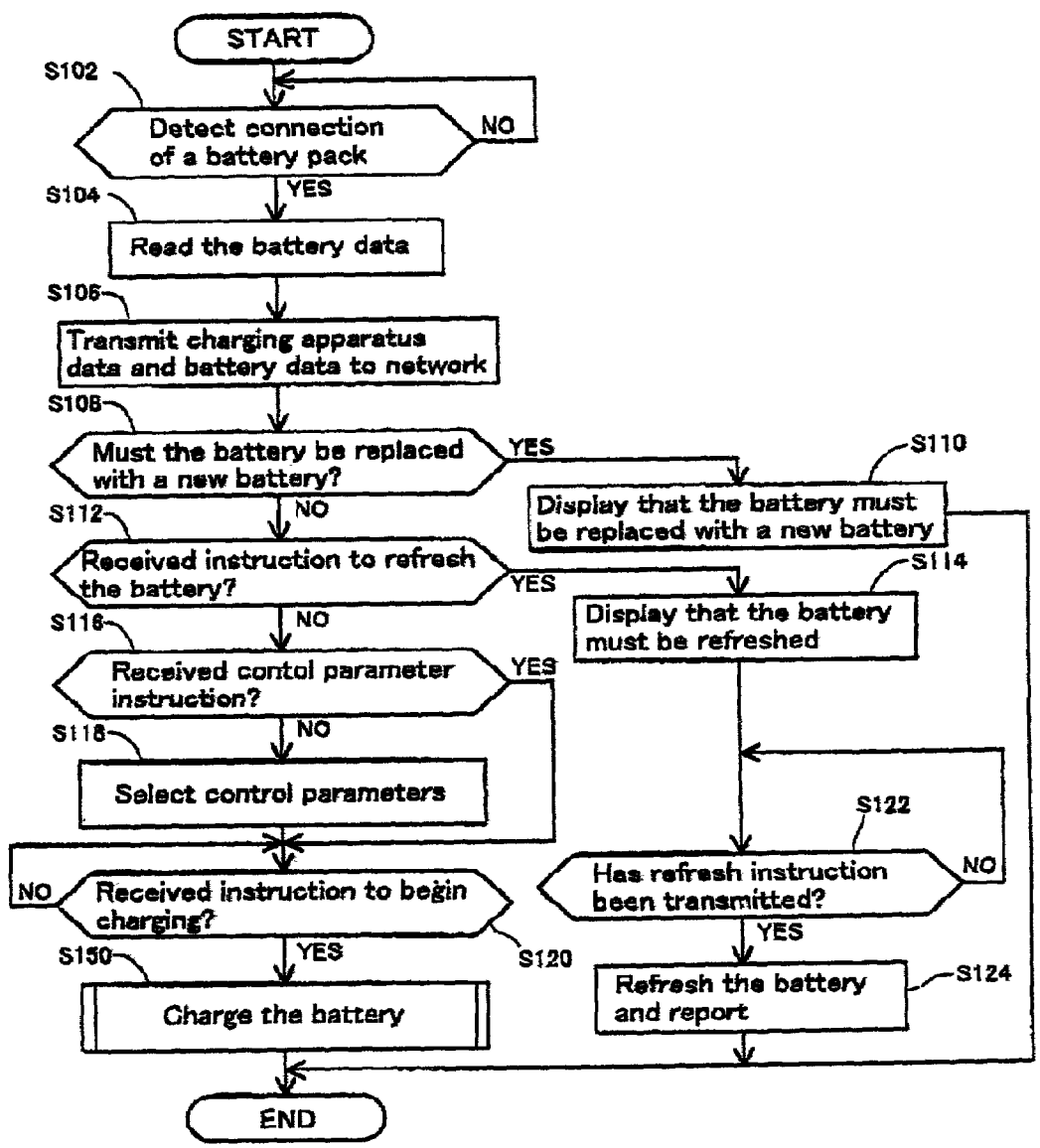
FIG. 7 is a flowchart showing a first representative control program that may be executed by the charging device.
Figure 8:
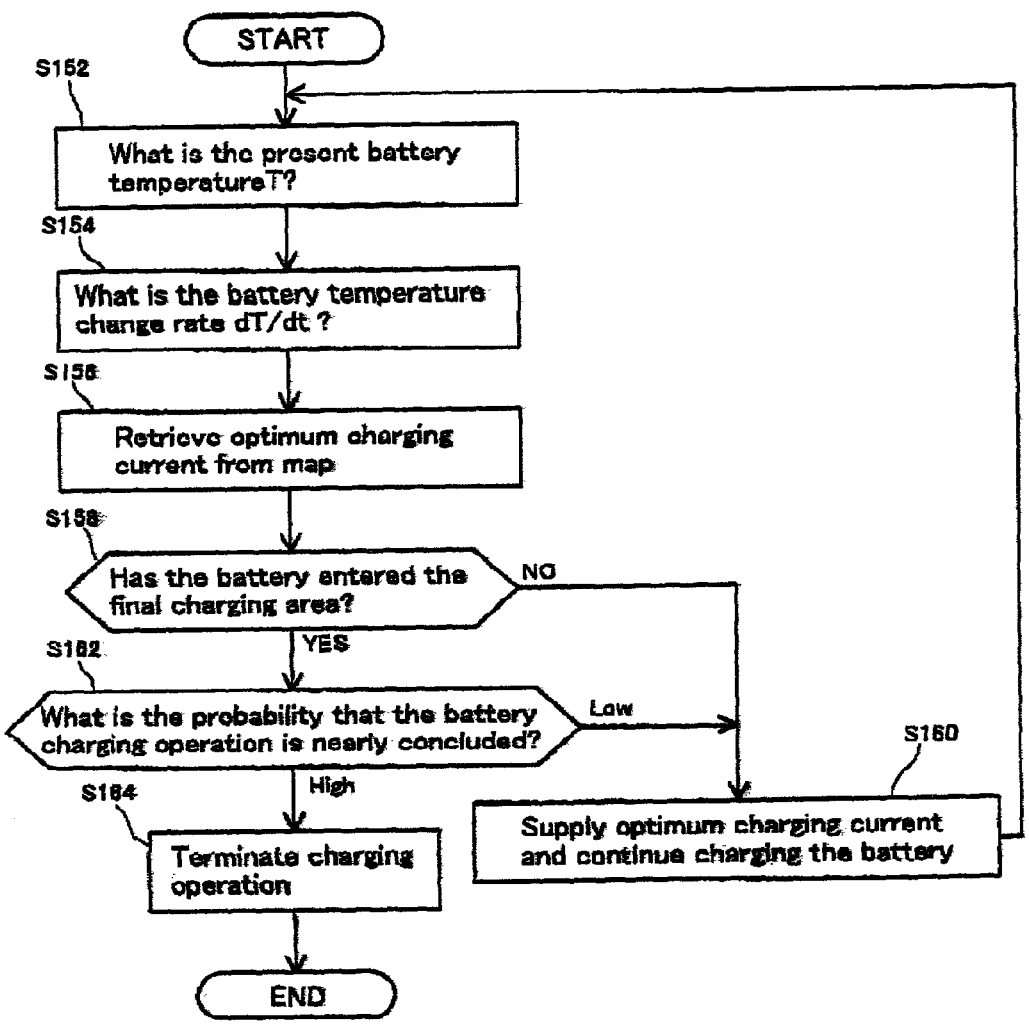
FIG. 8 is a flowchart showing a representative charging subroutine that may be utilized with the process of FIG. 7.

A representative program executed by charging device 30A will be explained with reference to the flowcharts in FIGS. 7 and 8. In step S102, charging device 30A waits for a battery pack to he mounted. When battery pack 50*d* is mounted (step S102: Yes), charging device 30A first reads out the identification information (d) of battery pack 50*d* and determines the remaining battery capacity based upon the detected battery voltage (step S104). Then, charging device 30A transmits to computer 10 via network 60 (1) identification information (a) concerning charging device 30A, (2) identification information (d) or battery pack 50*d* and (3) the remaining battery capacity of battery pack 50*d* (step S106). As was explained above with reference to step S26, if computer 10 determines that battery pack 50*d* has reached the end of its usable life (step S108: Yes), charging device 30A displays on monitor 33 that battery pack 50*d* must be replaced with a new battery pack (step S110).

On the other hand, as was explained with reference to step S30, if computer 10 indicates that battery pack 50*d* must be refreshed (step S117: Yes), charging device 30A displays on monitor 33 that battery pack 50*d* must be refreshed (step S114). Then, when charging device 30A instructs the operator to refresh battery pack 50*d* (step S122: Yes), battery pack 50*d* is refreshed using the refresh circuit 37, which was explained above with reference to FIG. 2. Thereafter, the fact that battery pack 50*d* has been refreshed is reported to computer 10 (step S124).

As was explained above with reference to step S34, if charging device 30A receives an instruction from computer 10 to select control parameters (step S116: Yes), charging device 30A will select control parameters and will select map M1 in this case (step S118). Then, when a charging start instruction is received from computer 10 (step S120: Yes), charging device 30A begins charging battery pack 50d using the charging parameters defined in map M1 (step S150).

The charging process in step S150 will be further explained with reference to the charging subroutine shown in FIG. 8. During the charging operation, controller 36 of charging device 30A (see FIG. 2) will repeatedly determine at a predetermined frequency or predetermined intervals (e.g., every 10 seconds or less) whether (1) the charging current must be adjusted (i.e., increased or decreased) and/or (2) the battery B has been fully charged. The present battery (absolute) temperature T is reached and then computer 10 differentiates the entered battery temperature T over time in order to calculate the battery temperature increase rate $dT/dt$ (step S154). Based upon the present battery temperature T and the calculated battery temperature increase rate $dT/dt$ computer 10 selects the optimal charging current from map M1 (step S156).

Thereafter, controller 36 determines whether the charging process has entered the final charging area of map M1 (step S158). That is, controller 36 determines whether a current has been selected from the final charging area of map M1. For example, the final charging area of map M1 may include areas I31, I32, I33, I34, or I35 (i.e., the battery temperature increase rate is relatively large) and area I25 (i.e., the battery temperature is relatively high and the battery temperature increase rate is an intermediate value). The representative final charging area is indicated with shading in map M1 of FIG. 3. If no current have yet been selected from the final charging area (step S158:. No), the current retrieved from map M1 is supplied to battery pack 50d in step S160 and the process returns to step S152. Thus, the charging operation continues by periodically changing the current so as to always supply an optimal charging current to battery pack 50d during the charging operation.

As the charging operation continues using various charging currents that are selected according to the battery temperature T and the battery temperature increase rate $dT/dt$, the battery temperature increase rate $dT/dt$ can be expected to gradual increase. For example, the battery temperature increase rate $dT/dt$ will likely eventually exceed X2 and thus, the battery temperature and battery temperature increase rate $dT/dt$ will indicate selection of the current identified in area I33. Thus, according to step S158, the charging process has entered the final charging area (area I31, I32, I33, I34, I35, or I25). Therefore, the probability is determined as to whether the charging process is nearly concluded (step S162). As discussed above, the charging current can be expected to vary widely during the present charging technique. Therefore, even if the charging process enters the final charging area for one time period, it is possible that battery temperature increase rate $dT/dt$ has only momentarily increased. Thus, by temporarily reducing the charging current, it will not be necessary to select currents from the final charging area. This situation is possible, e.g., if the battery is not yet close to being charged to its full battery capacity.

Therefore, in order to determine whether the battery is likely to have been charged to its full battery capacity (or near thereto), the charging process determines how frequently currents from the final charging area have been selected. For example, if currents have been selected from the final charging area for three consecutive cycles (time periods), the probability that the charging process has nearly concluded is relatively high. However, if reducing the current supplied to battery pack 50d reduces the battery temperature increase rate $dT/dt$ to the range between X1 and X2, the charging process will return to the non-final charging area I23. In this case, the probability that the charging process is nearly concluded is determined to be relatively low in step S162. Therefore, the process returns to step S160 and continues the charging operation according to steps S152, S154, S156 and S158.

On the other hand, if the battery has been charged nearly to its full battery capacity, the charging process may, e.g., enter area I25 (i.e., within the final charging area). In the next cycle (time period), the charging process may enter area I35 (i.e., within the final charging area). In the succeeding cycle, the charging process may enter area I35 (i.e., within the final charging area). Thus, when the charging cycle remains within the final charging area for three consecutive cycles or time periods, the probability is relatively high that the charging process has reached a conclusion. In that case, the charging operation may be terminated or concluded (step S164) and all further processing also may be terminated.

In the first representative embodiment, computer 10 manages a plurality of charging devices by classifying the charging devices, e.g., into work areas A and B according to their respective usage environments. Further, computer 10 calculates the optimal charging speeds for work areas A and B. Based upon the charging information received from each charging device 30, computer 10 transmits parameters to each charging device concerning the optimal charging period or charging speed for the particular work area. Each charging device then performs the battery charging operations based upon the transmitted parameters. Therefore, the charging devices can charge batteries within the optimum time for each work area (i.e., a work area having a common usage environment). Consequently, a plurality of batteries can be recharged at low operating costs.

Computer 10 also determines the need for refreshing based upon the battery identification information sent from the charging device 30. If refreshing is required, computer 10 transmits information to the charging device indicating that the battery must be refreshed, Then, when each charging device receives the information indicating that refreshing is required, the charging device displays the fact that the battery requires refreshing and/or simply performs the refresh operation without notifying the operator. Therefore, the batteries can be refreshed at an optimal timing based upon the charging history of the battery. Further, a plurality of batteries can be refreshed and charged in this manner.

Figure 9:
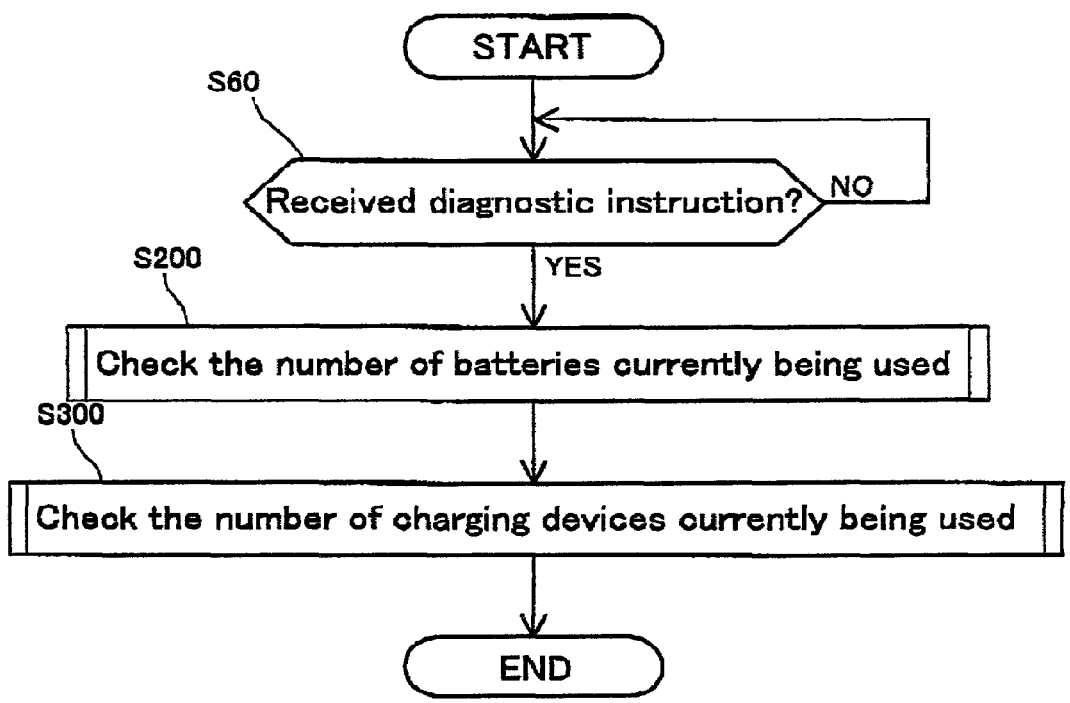
FIG. 9 is a flowchart showing a representative diagnostic process that may be executed by the computer processor.

In addition to managing the optimal charging speed and refreshing timing, computer 10 also may determine whether an optimal number of battery packs and charging devices are being used. A representative method for performing such optimization management will be further explained with reference to the flowcharts in FIGS. 9 through 11. As shown in FIG. 9, computer 10 waits for a diagnostic instruction to be entered from the operator (step S60). When a diagnostic instruction is received (step S60. Yes), computer 10 checks the number of batteries being used (step S200) and the number of charging devices being used (step S300). This information can then be utilized to determine the optimal number of batteries and charging devices that will be used within the work area (e.g., work area A).

Figure 10:
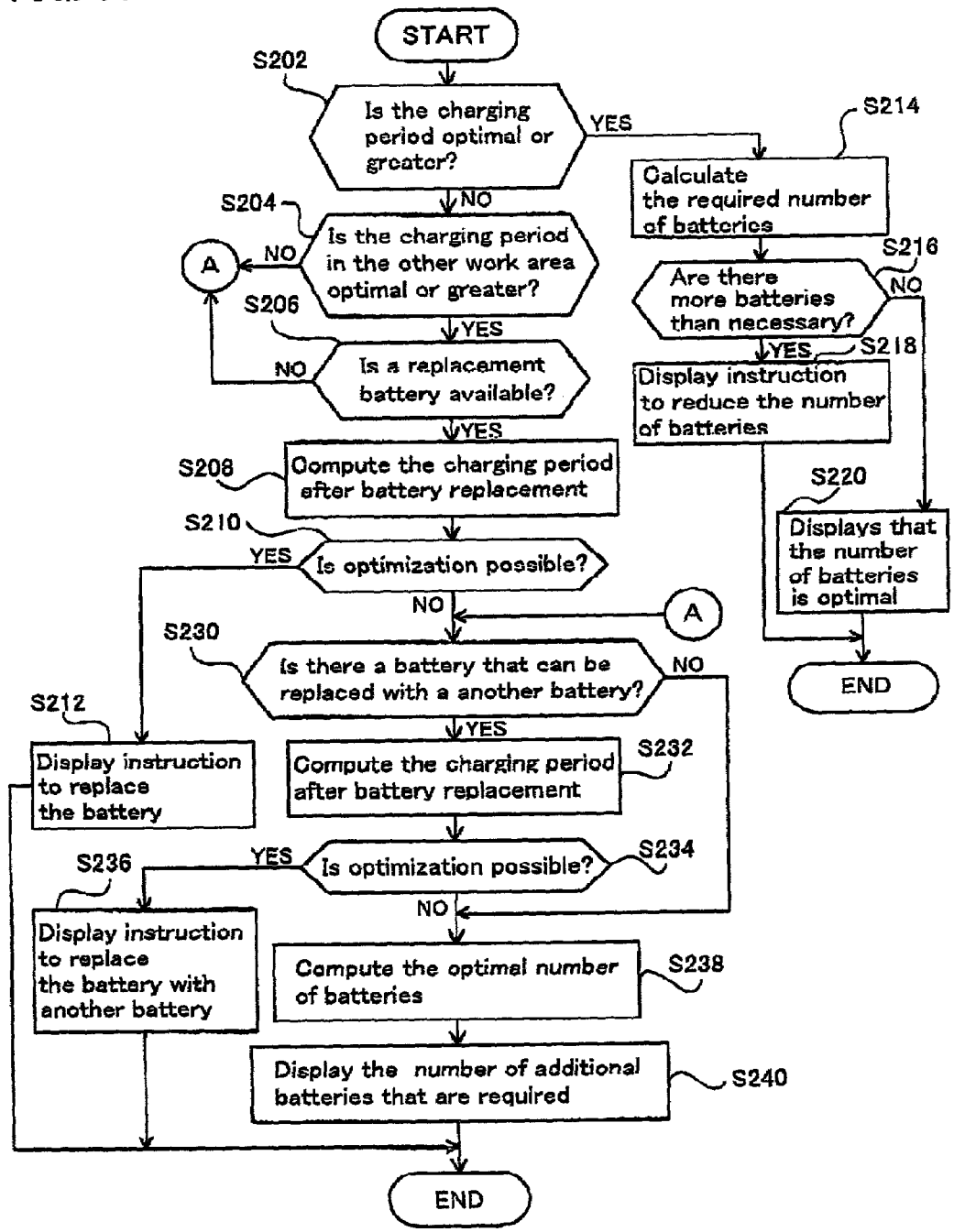
FIG. 10 is a flowchart showing a representative subroutine or checking the number of batteries being used, which subroutine may be utilized with the process of FIG. 9.

A representative process for determining the optimal number of batteries and charging devices that will be used within the work area will be explained with reference to the subroutine shown in FIG. 10. For example, computer 10 may determine whether or not the charging speed or charging period in the specified work area (e.g., assuming that work area A has been specified) is optimal (step S202). If the charging period is equal to or greater than the optimum value (e.g., 25 minutes) (step S202: Yes), computer 10 may calculate the number of batteries that will be necessary to optimize the charging period (step S214). If there are more batteries than necessary (step S216: Yes), computer 10 displays on monitor 11 (FIG. 1) an instruction to reduce the number of batteries currently in use (step S218). If the number of batteries is optimal (step S216: No), computer 10 displays that the number of batteries is optimal and ends the process (step S220).

On the other hand, if the charging period is shorter than the optimum value (step S202: No), computer 10 first determines whether or not the charging period in the other work area (Work area B in this case) is longer than necessary (step S204). If the charging period in work area B is determined to be long (step S204: Yes), computer 10 determines whether a new (or a relatively newer) battery pack can be transferred from work area B to work area A (step S206). If such a battery pack is available in work area B (step S206: Yes), computer 10 computes the charging period that would be required for charging if the old battery pack (i.e., having a reduced fully charged battery capacity) that is currently being used in work area A were to be replaced with the new (or relatively newer) battery pack from work area B (step S208). If it is possible to optimize the charging period by replacing the old battery pack in work area A with the battery pack from work area B (step S210: Yes), computer 10 displays an instruction to replace the old battery pack in work area A with the battery pack from work area B (step S212).

On the other hand, it may not be possible to optimize the charging speed even by replacing the old battery pack in work area A with the battery pack from work area B (step S210: No). In this case, computer 10 determines whether or not another previously used battery pack (e.g., having a charging count of 450 or more) can replace the old battery pack in work area A (step S230). If such a previously used battery pack is available (step S230: Yes), computer 10 computes the charging speed that would be required if that battery pack were to replace the old battery pack (step S232). If it is possible to optimize the charging speed by replacing the old battery pack with another battery pack (step S234: Yes), computer 10 displays an instruction to replace the old battery pack with another battery pack (step S236). However, if it is not possible to optimize the charging speed (step S234: No), computer 10 computes the number of batteries necessary to optimize the charging speed (step S238) and displays the number of additional batteries that are required (step S240).

Figure 11:
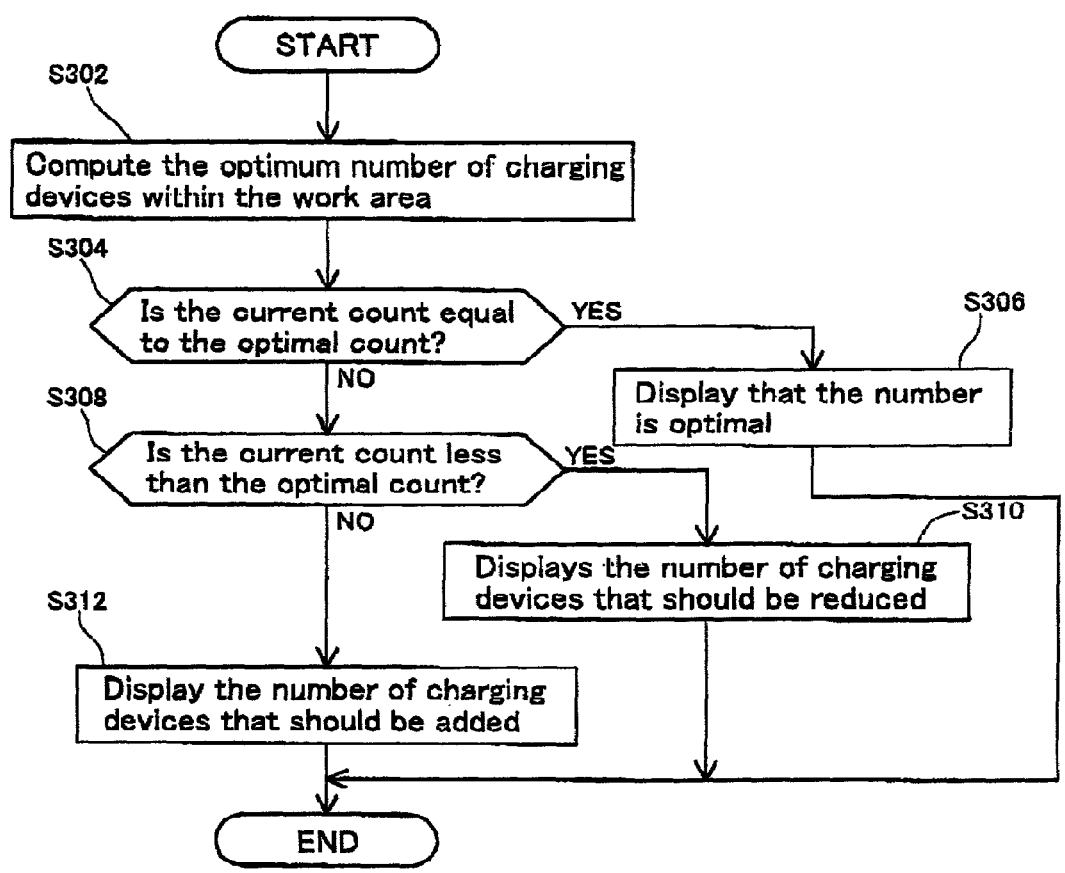
FIG. 11 is a flowchart showing a representative subroutine for checking the number of charging devices being used, which subroutine may be utilized with the process of FIG. 9.

FIG. 11 shows a representative process for informing the operator of the optimal number of charging devices that should be used. For example, computer 10 may first determine the optimum number of charging devices within the specified work area (e.g., work area A) (step S302). If the number of charging devices is optimal (step S304: Yes), computer 10 displays on monitor 11 (see FIG. 1) that an optimal number of charging devices are being used (step S306). If the number is greater than the optimum value (step S308: Yes), computer 10 displays the number of the charging devices that should be reduced (i.e., the number of charging devices that can be removed from network 60) (step S310). If the number is less than optimal (step S308: No), computer 10 displays the number of charging devices that should be added to network 60 (step S312).

In the first representative embodiment, computer 10 determines the optimal number of batteries based upon the charging information received from the charging devices and displays this optimum number. Thus, an optimal number of batteries can be utilized in order to minimize operating costs. Furthermore, computer 10 determines the optimum number of charging devices based upon the charging information received from the charging devices and displays this optimum number. Thus, an optimal number of charging devices also can be utilized in order to minimize operating costs. These calculations will allow the operator to strategically locate charging devices and battery packs in various different work area (e.g., A and B) so as to have optimal numbers of ring devices and battery packs in each work area. By utilizing this information, the battery packs can advantageously be recharged using lower charging current that will avoid damaging the batteries, thereby prolonging the usable life of the battery packs and minimizing operating costs.

In the first representative embodiment, computer 10 is preferably connected to the charging devices via network 60. However, network 60 may instead be wireless (e.g., infrared communications) and signals may be transmitted without wires or other communication lines. In addition, the above-described control programs (software) (i.e., the flowcharts shown in FIGS. 5 through 11) may be installed in computer 10 and charging devices 30 using a storage medium, such as a floppy disk, or may be installed via a communication line or via network 60.

Second Representative Embodiment

A second representative arrangement for managing a plurality of charging devices will be explained with references to FIGS. 12 through 17. In the first representative embodiment, the charging devices store two or more charge control maps (LUTs) and computer 10 selects the appropriate charge control map (LUT) for charging the specific battery pack installed in the charging device. However, in the second representative embodiment, computer 10 generates appropriate charge control maps (LUTs) and transmits the generated charge control maps via network 60 to the respective charging devices. The charging devices store the transmitted charge control maps and adjust the charging current based upon the charge control maps.

Figure 12:
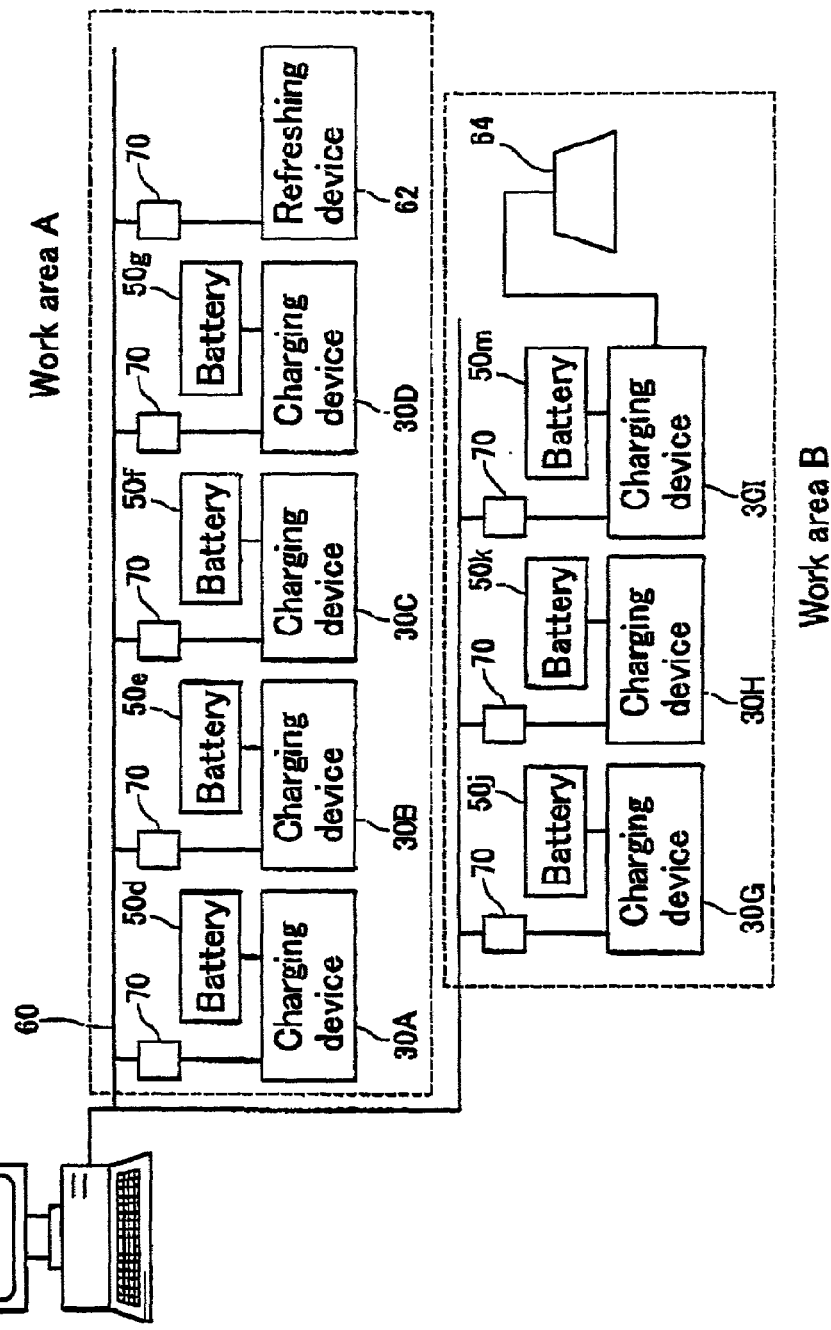
FIG. 12 shows a second representative arrangement for managing a plurality of charging devices.

FIG. 12 shows a representative environment and arrangement for managing a plurality of charging devices according to the second representative embodiment. The configuration of the second representative embodiment is, generally speaking, the same as the configuration of the first representative embodiment. However, in the first representative embodiment, a plurality of charging devices is directly connected to the network 60. On the other hand, in the second representative embodiment, a plurality of charging devices 30A, 30B, 30C, 30D, 30G, 30H, and 30I are connected to the network 60 via adapters 70. Furthermore, in the second representative embodiment, an illumination means 64 is connected to charging device 30I. Illumination means 64 is used for lighting operator's work area when an operator has troubles in working dark area. Moreover, a dedicated refreshing device 62 for performing the refreshing operation is connected to the network 60.

Figure 13:
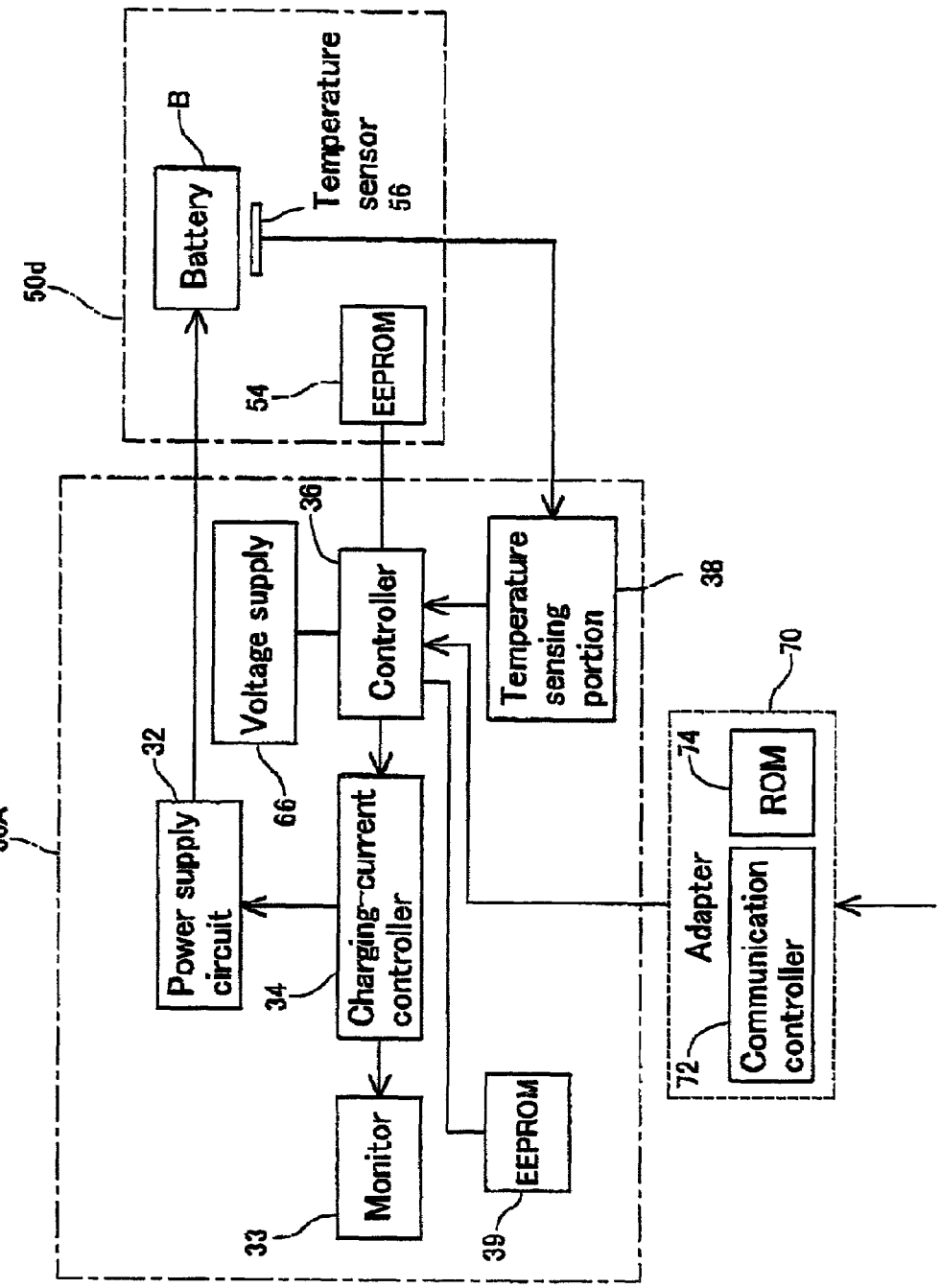
FIG. 13 shows block diagrams of a second representative charging device and a second representative battery pack.

A representative configuration of charging device 30A of the second representative embodiment will first be explained. FIG. 13 shows a block diagram of representative charging device 30A, representative battery pack 50$d$ and representative adapter 70. Because charging device 30A is nearly identical to the charging device 30A of the first representative embodiment, only the difference require explanation and identical features of charging device 30A are incorporated herein by reference. Charging device 30A may include a voltage supply device 66 for supplying power to an external device (e.g., the illumination means 64). Further, the refresh circuit 37 and interface 35 are not required in the second representative charging device 30A, which will be discussed further below.

Adapter 70 may preferably include ROM 74 and communication controller 72 for handling communications between charging device 30A and computer 10. Identification information for adapter 70 may be stored in ROM 74.

In the first representative embodiment, identification information (A) for charging device 30A is stored in EEPROM 39 of the charging device. On the other hand, the second representative embodiment may be advantageously utilized with general-purpose charging devices that do not store identification information. In this case, appropriate identification information may be stored in the respective adapters 70. Further, although each of the charging devices in the first representative embodiment included a refresh circuit, refresh circuits have been eliminated from the charging devices of the second representative embodiment by providing dedicated refreshing device 62, which is shown in FIG. 12.

Figure 17:
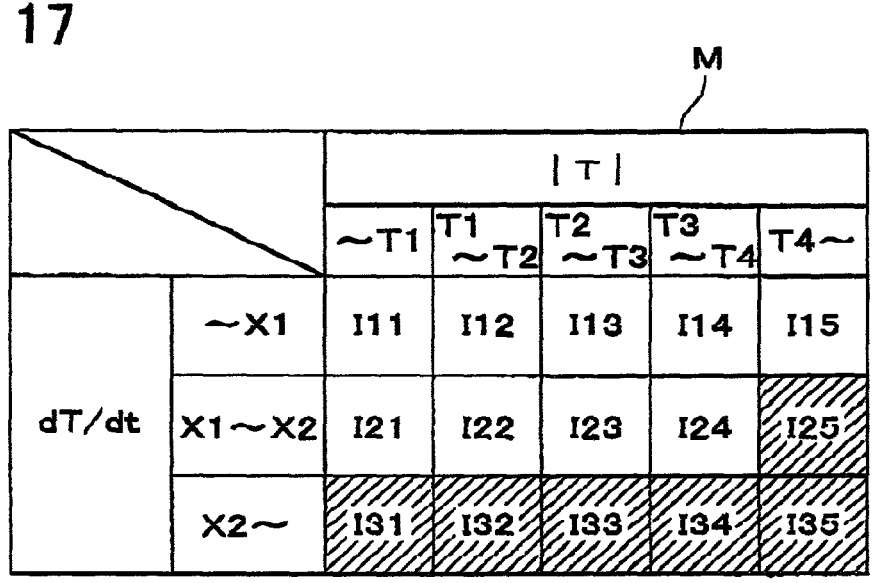
FIG. 17 shows a representative map or look up table (LUT) that may be stored in an EEPROM of the charging device.

FIG. 17 shows a representative map M that may be generated by computer 10, transmitted to a respective charging device and then stored in EEPROM 39 of the charging device. As discussed above, in the first representative embodiment, the charging device stores multiple maps, and the computer specifies which map will be used for each charging operation. On the other hand, in the second representative embodiment, the computer generates the optimal charging control map for each work area and transmits the generated map to the charging device via network 60. The charging device then stores the received map in EEPROM 39 and performs the charging operation within the optimum period based upon the stored map.

In additional, in the second representative embodiment, EEPROM 54 with battery pack 50d stores a password for each work area. By requiring a password to be entered for each work area, the battery can only be charged in the appropriate work area. That is, the battery can not be charged in a different work area. For example, by setting a password dedicated to work area A for the battery packs that will be used in work area A, these battery packs cannot be charged in work area B. Furthermore, the password may ensure that a general-purpose charging device can not recharge battery pack 50d. Therefore, thefts of battery pack 50d may be reduced, because battery park 50d can only be recharged in work area A.

Figure 14:
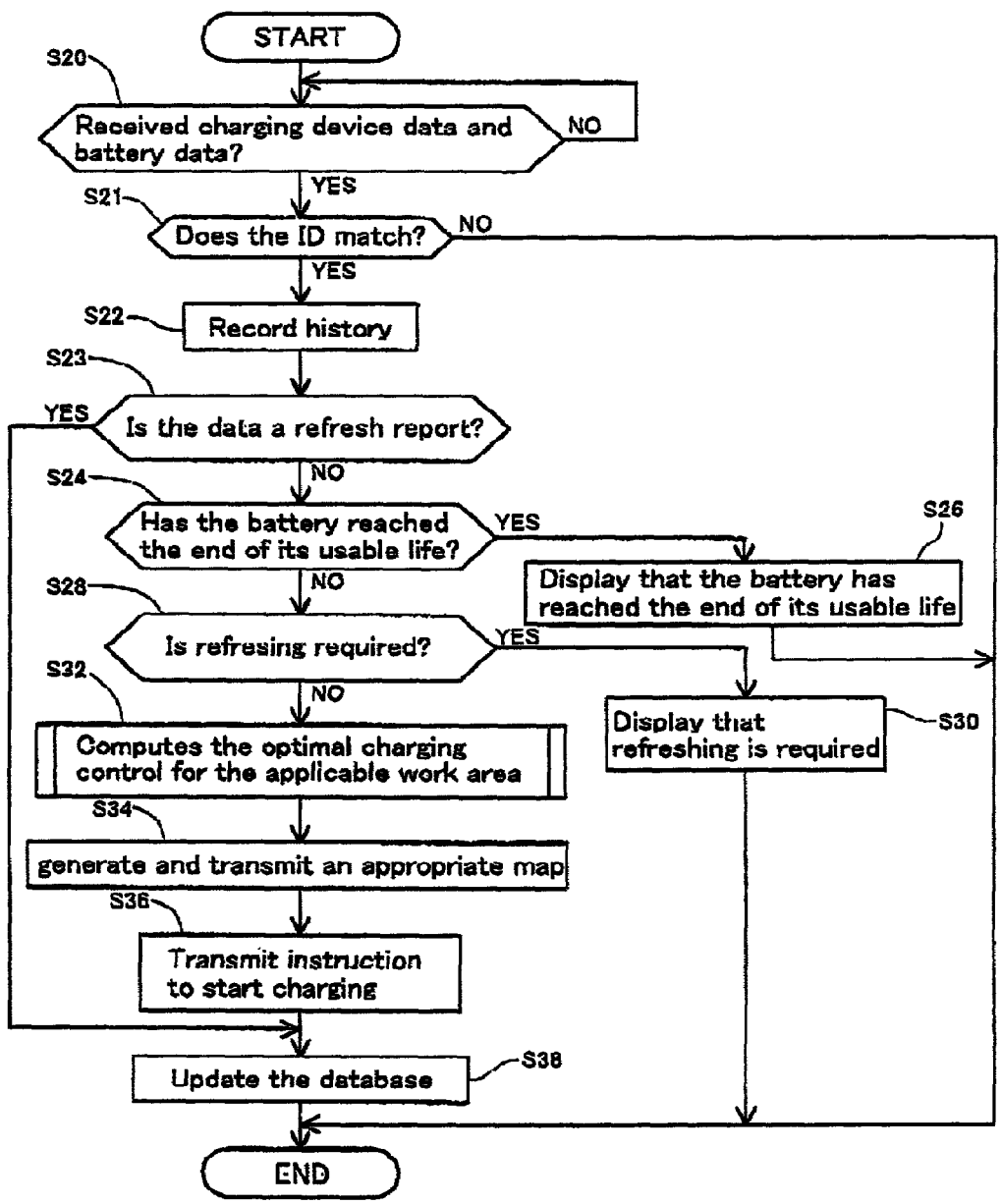
FIG. 14 is a flowchart showing a second representative control program that may be executed by the computer processor.

FIG. 14 shows a representative program that may be executed by computer 10. For example, when battery pack 50d is mounted on charging device 30A, the identification information (A) of adapter 70 that is coupled to charging device 30A, the identification information (d) and password of battery pack 50d, and the remaining battery capacity of battery pack. 50d at the start of the charging operation are sent from adapter 70 to computer 10. The present explanation will describe an example in which charging device 30A in work area A, as shown in FIG. 12, will charge battery pack 50d. Computer 10 waits for data to he sent from the various adapters 70 (step S20). When data is transmitted from one adapter 70, computer 10 receives this data (step S20, Yes). Then, computer 10 determines whether the password from the battery pack matches the password for work area (A) (step S21). If the passwords match, an authorized battery pack will be charged (step S21: Yes) and the process proceeds to step S22. On the other hand, if the passwords do not match, an unauthorized battery pack has been installed in charging device 30A (step S21: No) and the process is terminated.

After determining whether or not the passwords match (stop S21: Yes), computer 10 records that charging device 30A is about to charge battery pack 50d (step S22) based upon the data transmitted from charging device 30A. Computer 10 than determines whether or not the data is a refresh report (step S23) and then determines whether or not battery pack 50d has reached the end of its usable life based upon its use history (step S24). For example, if battery pack 50d has reached the end of its usable life (i.e., battery pack 50d has been charged and discharged so many times that battery park 50d has reached its lifetime charging count setting (step S24: Yes)), computer 10 instructs charging device 30A that battery pack 50d has reached the end of its usable life and ends the process (step S26), Therefore, charging device 30A will display on monitor 33 (see FIG. 13) that battery pack 50d must be replaced.

If battery pack 50d does not require replacement, computer 10 determines whether or not battery pack 50d requires refreshing based upon its charging history and remaining battery capacity (step S28). For example, if battery pack 50d has been charged five times without being refreshed and if the remaining battery capacity is at least 30% (step S28: Yes), computer 10 will instruct charging device 30A to refresh battery pack 50 and will end the process (step S30). If battery pack 50d requires refreshing, charging device 30A displays on monitor 33 (see FIG. 13) that the battery pack must be refreshed.

In response to this display, the operator preferably moves battery pack 50d from charging device 30A to the refreshing device 62 (see FIG. 12) and refreshes battery pack 50d. A representative subroutine for refreshing battery pack 50d using refreshing device 62 will be explained with reference to FIG. 16. Generally speaking, refreshing device 62 waits for an instruction to begin a refresh operation. When a refreshing instruction is received (step S402: Yes), refreshing device 62 performs a refreshing operation and reports to computer 10 when the refreshing operation has been completed (step S404). Then, when computes 10 receives this report (step S23: Yes), computer 10 updates its database by adding a record indicating that battery pack 50d has been refreshed (step S38) and ends the process.

Similar to the first representative embodiment computer 10 preferably computes the optimal charging period for work area A and generates a map that will achieve this optimal charging period (step S32). Computer 10 then transmits this map to charging device 30A (step S34). In the second representative embodiment, computer 10 generates and transmits the optimal charge control map(s) to the respective charging devices. After charging device 30A receives the map M from computer 10, computer 10 instructs charging device 30A to begin charging (step S36) and charging device 30A will perform the charging operation using the received map. Finally, computer 10 may update its database by adding a record indicating that battery pack 50d was charged according to the particular map and may then end the process (step S38).

Figure 15:
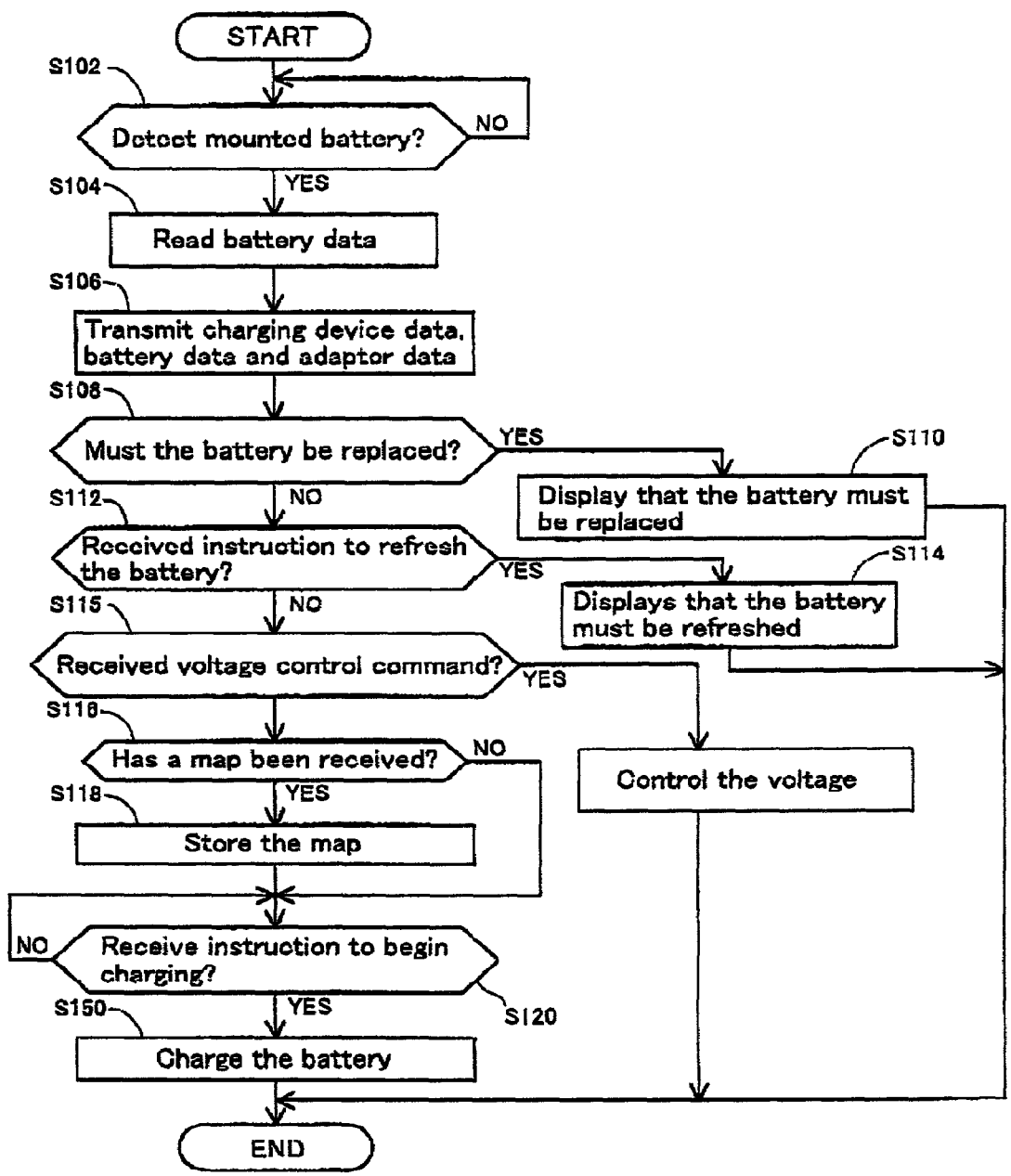
FIG. 15 is a flowchart showing a second representative control program that may be executed by the charging device.
Figure 16:
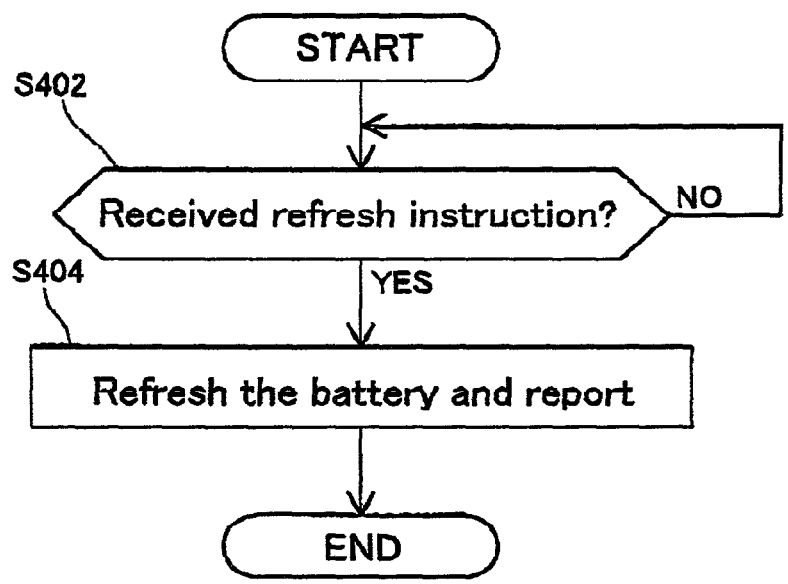
FIG. 16 is a flowchart showing a representative refreshing process.

A representative program that may be executed by charging device 30A will be explained with reference to the flowchart in FIG. 15. For example, charging device 30A may wait for a battery pack to be mounted thereon (step S102).

When battery pack 50d is mounted (step S102: Yes), charging device 30A reads out the identification information (d) of battery pack 50d and also calculates the remaining battery capacity based upon the detected battery voltage (step S104). Then, adapter 70 then transmits to computer 10 the identification information (A) of adapter 70, as well as the identification information (d), password, and remaining battery capacity of battery pack 50d (step S106). Then, as was explained above with reference to step S26, if computer 10 indicates that battery pack 50d has reached the end of its usable life (step S108: Yes), charging device 30A displays on monitor 33 that battery pack 50d must be replaced with another battery pack (step S110).

On the other hand, as was explained above with reference to step S30, if computer 10 indicates that battery pack 50d requires refreshing (step S112: Yes), charging device 30A displays on monitor 33 that battery pack 50d must be refreshed (step S114). Furthermore, when a command to control the voltage output from voltage supply device 66 is received from computer 10 (step S115: Yes), charging device 30A controls voltage supply device 66 (step S152). For example, if illumination means 64 is connected to charging device 30I as shown in FIG. 12, the voltage applied to illumination means 64 from voltage supply device 66 is adjusted in order to adjust the brightness of illumination means 64.

As was explained above with reference to step S34 in FIG. 14, computer 10 may transmit a charging control map (step S116: Yes) and charging device 30A stores the charging control map (step S118). Then, when charging device 30A receives a charge start instruction from computer 10 (step S120: Yes), charging device 30A begins charging battery pack 50d based upon the stored map M (step S150). Because the charging process in step S150 may be the same, or substantially the same, as in the first representative embodiment, which was explained above with reference to FIG. 8, further explanation of the charging process is not required and instead the explanation with respect to FIG. 8 is incorporated by reference into the second representative embodiment.

In the second representative embodiment, computer 10 manages a plurality of charging devices by classifying the charging device into work areas A and B according to their respective usage environments. Computer 10 also generates Maps for selecting the optimal charging currents for work areas A and B by determining to which the work area the charging device that has sent charging information belongs. These maps may be generated based upon the charging information received from each charging device. Computer 10 also may transmit the generated maps to the respective charging devices. Each charging device then performs a charging operation based upon the stored map. Therefore, the charging devices can charge batteries within the optimum period for each work area having a common usage environment, thereby minimizing operating costs.

Third Representative Embodiment

A third representative arrangement for managing a plurality charging devices will now be explained with references to FIGS. 18 through 22. In the first and second representative embodiments, the respective charging devices directly control or adjust the charging current supplied to charge the batteries. However, in the third representative embodiment, the computer may directly control the charging current supplied to the batteries.

Figure 18:
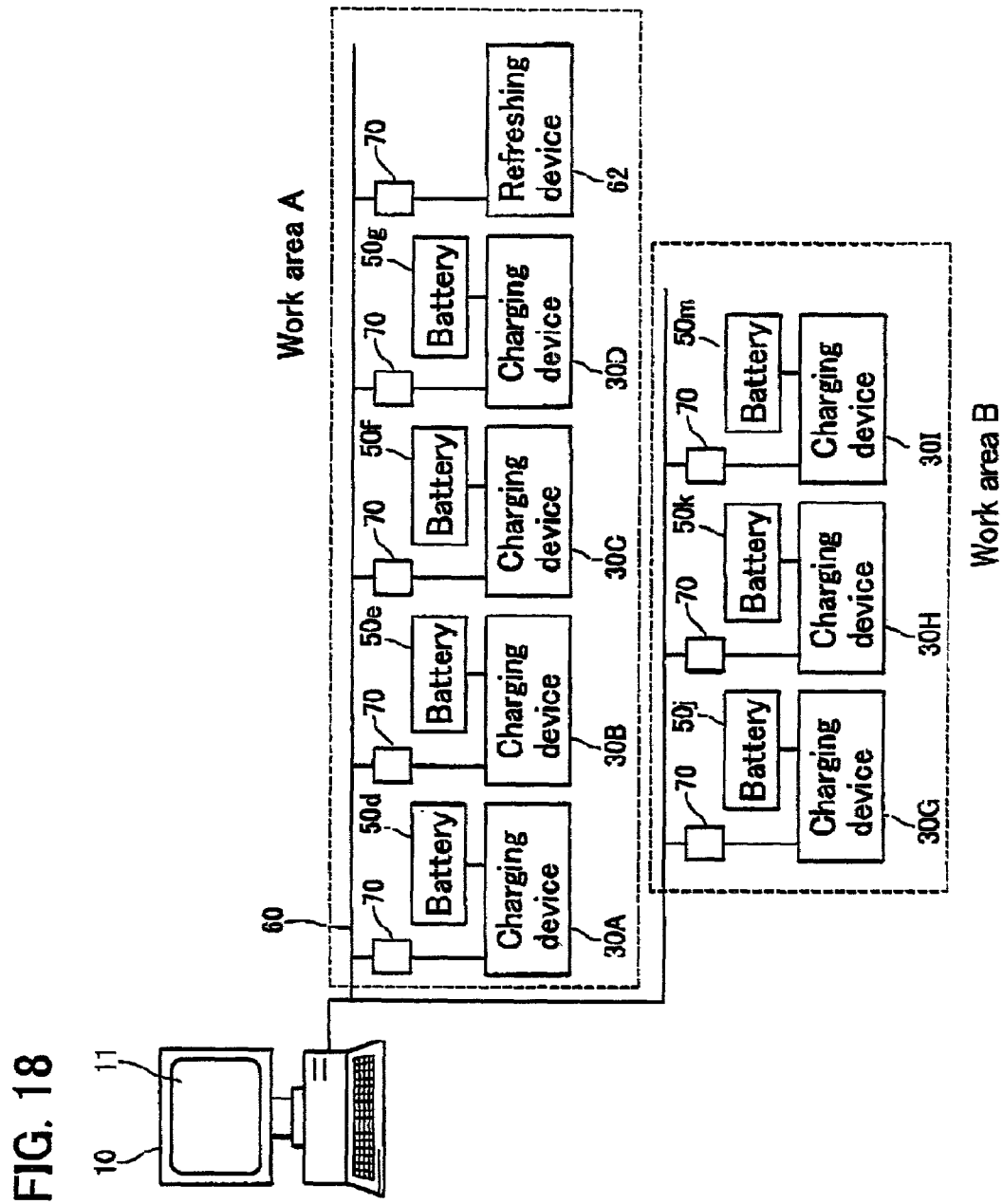
FIG. 18 shows a third representative arrangement for managing a plurality of charging devices.
Figure 19:
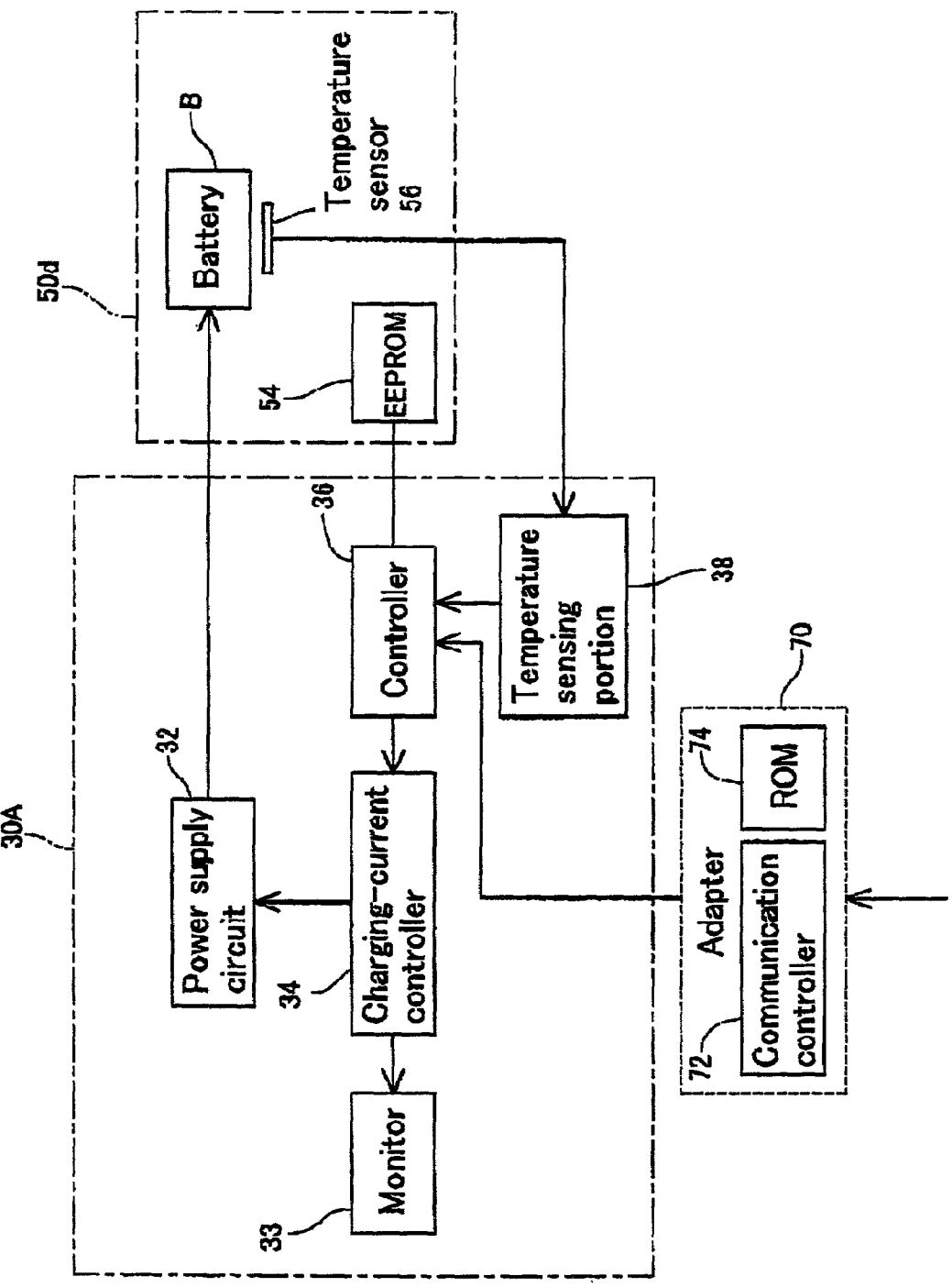
FIG. 19 shows block diagrams of a third representative charging device and a second representative battery pack.

FIG. 18 shows a representative environment for managing a plurality of charging devices in the third representative embodiment, which is generally similar to the second representative embodiment shown in FIG. 12. However, the third representative embodiment does not include illumination means 64, which element is optional according to the present teachings. Further, FIG. 19 shows a block diagram of representative charging device 30A, representative battery pack 50d and representative adapter 70. Charging device 30A may include elements that are identical to charging device 30A shown in FIG. 13 of the second representative embodiment. Therefore, it is not necessary to provide further explanation concerning the identical elements.

In the first representative embodiment, the identification information (A) for charging device 30A is stored in EEPROM 39. However, in the third representative embodiment, the identification information is stored in the respective adapter 70, which is similar to the second representative embodiment In the third representative embodiment battery pack EEPROM 54 does not store charging control parameters. Therefore, battery packs utilized with the network of the third representative embodiment are designed so that a general-purpose charging device can not recharge these battery packs, thereby reducing the incentive for theft. General-purpose charging device needs charging control parameters stored in the battery pack for charging the battery pack.

Figure 20:
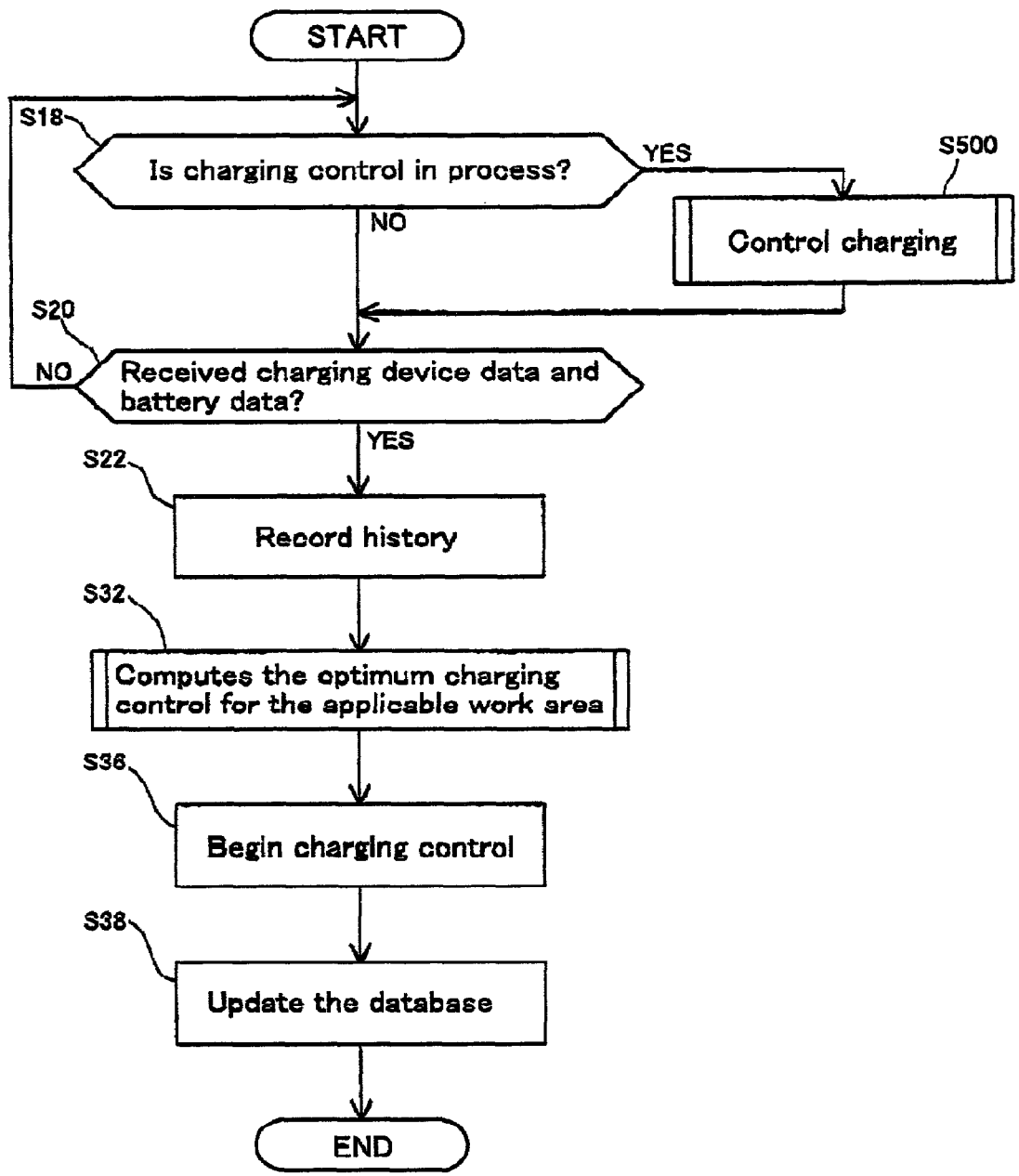
FIG. 20 is a flowchart showing a third representative control program that may be executed by the computer processor
Figure 21:
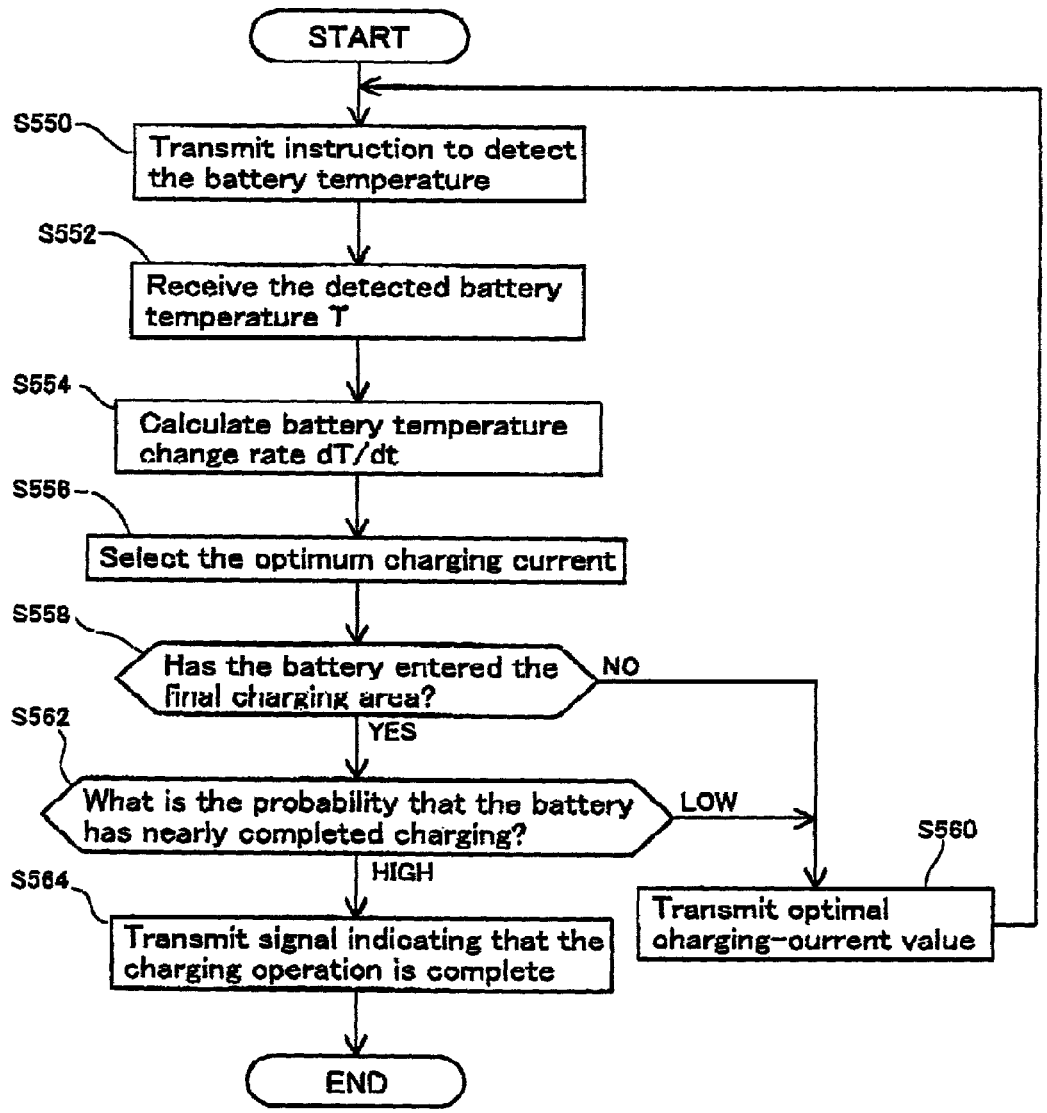
FIG. 21 shows a representative charging control subroutine that may be utilized with the program of FIG. 20.

The flowcharts in FIGS. 20 and 21 will be utilized to explain how computer 10 can manage the charging devices 30A according to the third representative embodiment. The following explanation will assume that charging device 30A in work area A shown in FIG. 18 will charge battery pack 50d.

Before charging device 30A begins charging control (step S18. NO), computer 10 waits for adapter 70 to transmit data/instructions (step S20). When battery pack 50d is mounted on charging device 30A, adapter 70 transmits identification information (A) of adapter 70 installed in charging device 30A, identification information (d) and the password of battery pack 50d, and the remaining battery capacity at the start of the charging operation. After computer 10 receives this information (step S20: Yes), computer 10 records that charging device 30A is about to begin charging battery pack 50d (step S22). As in the second representative embodiment, computer 10 may then compute the optimal charging period for work area A and generate the optimal charge control map (step S32). Then, computer 10 instructs charging device 30A to begin the charging operation (step S36) and charging device 30A begins the charging operation. Computer 10 may then update its database by recording that battery pack 50d has been charged using the transmitted map and may then end the process (step S38).

Figure 22:
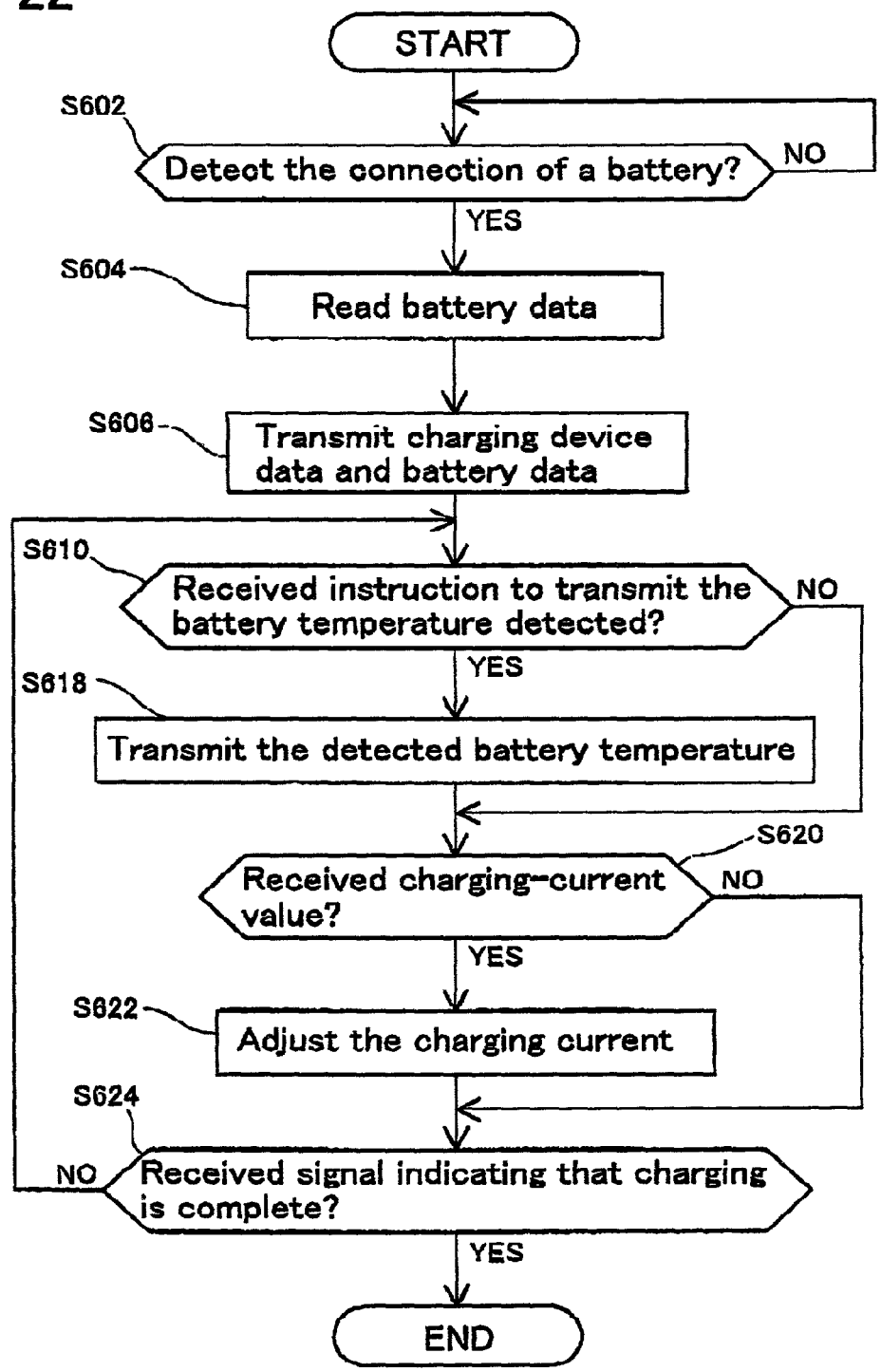
FIG. 22 is a flowchart showing a third representative control program that may be executed by the charging device.

A representative subroutine that may be executed by charging devices 30A will now be explained with reference to the flowchart in FIG. 22. For example, charging device 30A waits for a battery pack to be mounted (step S602). When battery pack 50d is mounted (step S602: Yes), charging device 30A reads out the identification information (d) of battery pack 50d and also determines the remaining battery capacity based upon the detected battery voltage (step S604). Then, charging device 30A transmits to computer 10 the identification information (A) of adapter 70, as well as the identification information (d) and the remaining battery capacity of battery pack 50d (step S606). When charging device 30A receives an instruction to transmit the detected battery temperature (step S610), charging device 30A transmits the detected battery temperature to computer 10 (step S618). Thereafter, computer 10 will transmit charging-current instructions (step S620: Yes) and charging device 30A will adjust the charging currentupplied to battery pack 50d based upon these instructions (step S622). Steps S610 through S622 naturally may be repeated until a charge completion signal is received from computer 10 (step S624: Yes), at which time the process is terminated.

A representative subroutine that may be executed by computer 10 in step S500 of FIG. 20 will now be explained with reference to FIG. 21. For example, during the charging operation computer 10 may adjust or change the charging current and may determine when the battery has been fully charged at predetermined intervals (e.g., at a frequency of 10 seconds or less). At the initiation of the charging operation, computer 10 may instruct the charging device to transmit the present battery temperature T (step S550). When computer 10 receives the detected battery temperature T (step S552), computer 10 may differentiates the stored battery temperature T in order to compute battery temperature increase rate dT/dt (step S554). Based upon the present battery temperature T and battery temperature increase rate dT/dt, computer 10 then selects the optimal charging current from the charge control map.

Thereafter, computer 10 determines whether the changing process has entered into the final charging area (i.e., whether one of the current identified in the shaded areas of FIG. 17 has been selected) (step S558). Before the charging process has entered the final charging area (step S558: No), computer 10 instructs the charging device 30A to supply the charging current retrieved from the map in step S560. The process then returns to step S550 in order to continue to control the charging operation.

This subroutine is followed until the charging process has entered the final charging area (step S558: "Yes"). At this time, computer 10 determines whether there is a high probability that the charging process has nearly completed (step S562). If there is a high probability that the charging process has nearly completed, computer 10 transmits a signal indicating that the charging operation is complete to the charging device (step S564) and terminates all processes.

Because computer 10 of the third representative embodiment can control the charging operation, the charging devices 30 can be configured relatively inexpensively. Further, because certain functions can be eliminated from battery park 50d, charging device 30A and adapter 70, these parts can be manufactured more economically.

Fourth Representative Embodiment

Figure 23:
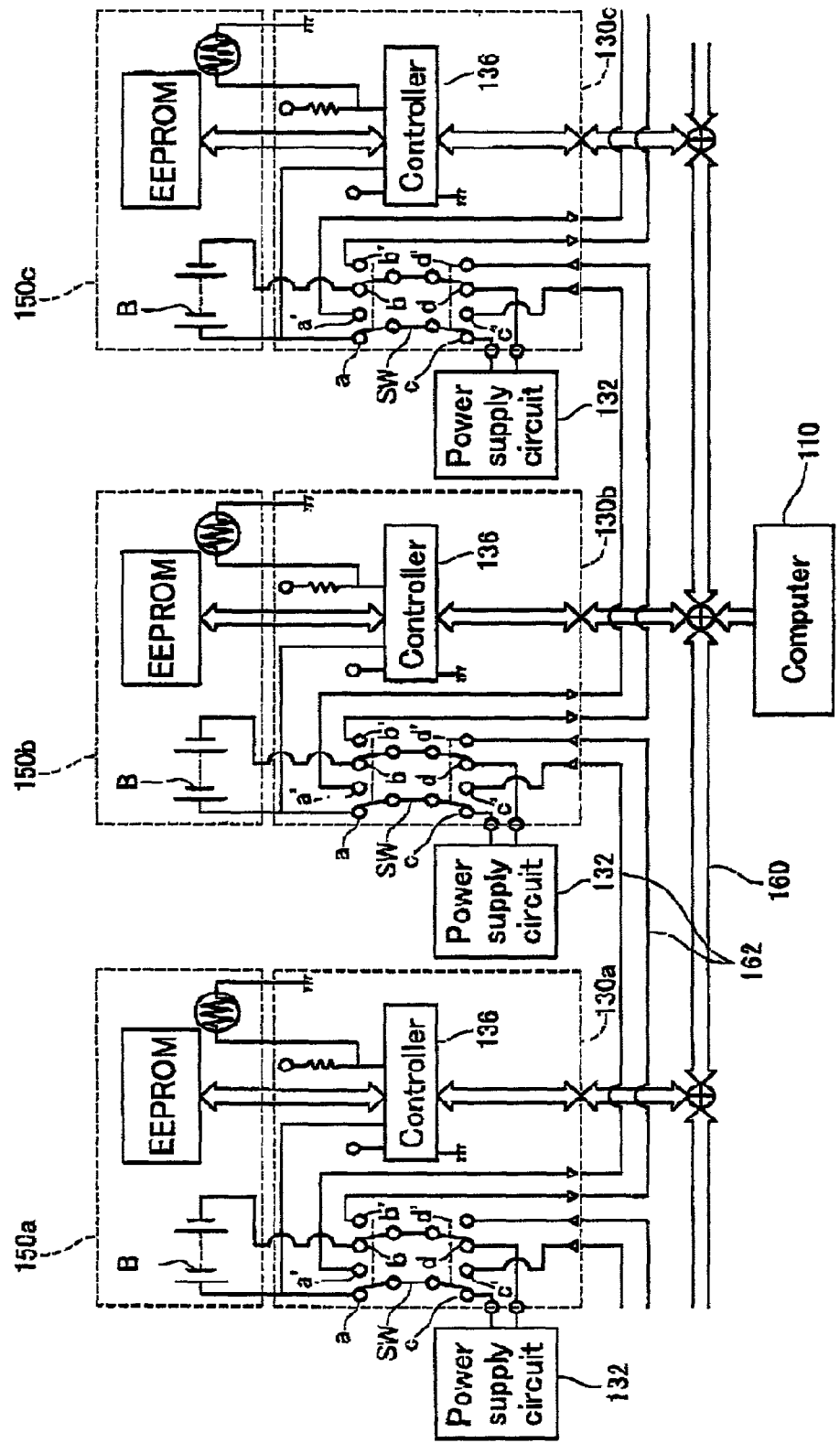
FIG. 23 shows a fourth representative arrangement for managing a plurality of charging devices.
Figure 24:
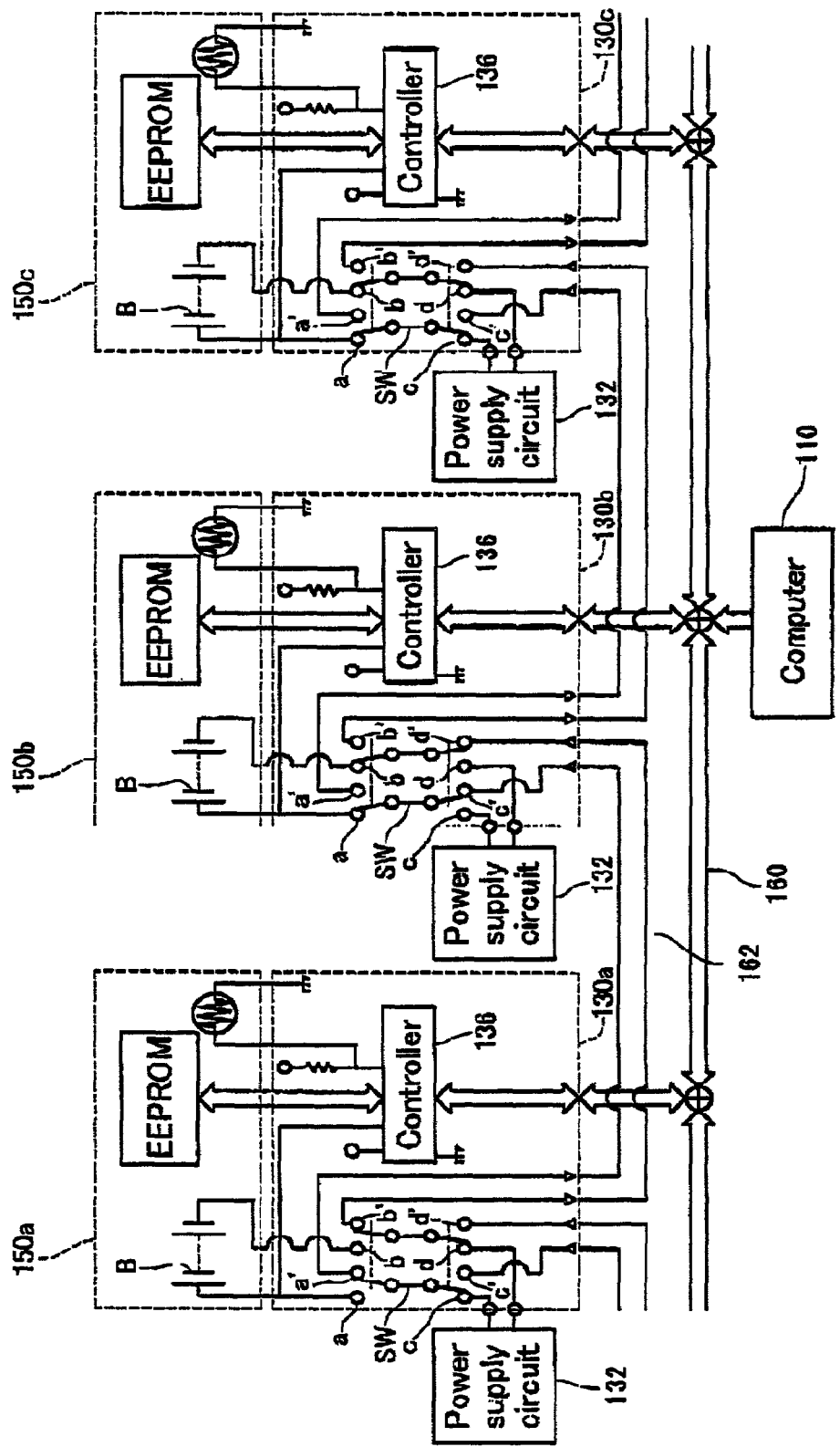
FIG. 24 shows the fourth representative arrangement for managing a plurality of charging devices performing an error correction process.

A fourth representative arrangement for managing charging devices will now be explained with references to FIGS. 23 through 25. FIGS. 23 and 24 show representative circuits of the charging devices of the fourth representative embodiment. Charging devices 130a, 130b, and 130c may each include a power supply circuit 132 for supplying power to battery B. Further, each power supply circuit 132 may be connected to the respective batteries B of battery packs 150a, 150b, or 150c via a switch SW. In addition, charging devices 130a, 130b, and 130c may be connected so that current can be supplied via power lines 162. Charging devices 130a, 130b, and 130c are also connected to computer 110 via network 160. For example, switch SW may normally be connected to contact a, contact b, contact c, and contact d. Thus, current will be supplied from power supply circuit 132 of the respective charging device to which battery B is connected.

FIG. 25 shows a representative technique for handling an error in the power supply circuit 132. When computer 110 detects an error in a power supply circuit, e.g., an error in the power supply circuit 132 of the charging device 130b (step S702: Yes in FIG. 25), the computer 110 toggles the adjacent switches SW of the charging device 130a and of the defective charging device 130b (step S704 in FIG. 25). Then, current is supplied from power supply circuit 132 of charging device 130a to battery pack 50b connected to charging device 130b via power lines 162. That is, a shown in FIG. 24, switch SW of charging device 130a is connected to contact a', contact b', contact c, and contact d. In addition, the switch SW of charging device 130b is connected to contact a, contact b, contact c', and contact d'. Computer 110 then displays the error of charging device 130b (step S706).

As a result, the operator will understand that charging device 130b requires repair and resetting. When charging device 130b has been repaired and reset (step S712: Yes), computer 110 restores switches SW of the respective charging devices to their normal states (step S714). Thus, the fourth representative embodiment provides an advantage in that the charging operation can be continued even if an error occurs in a power supply circuit.

Fifth Representative Embodiment

Figure 26:
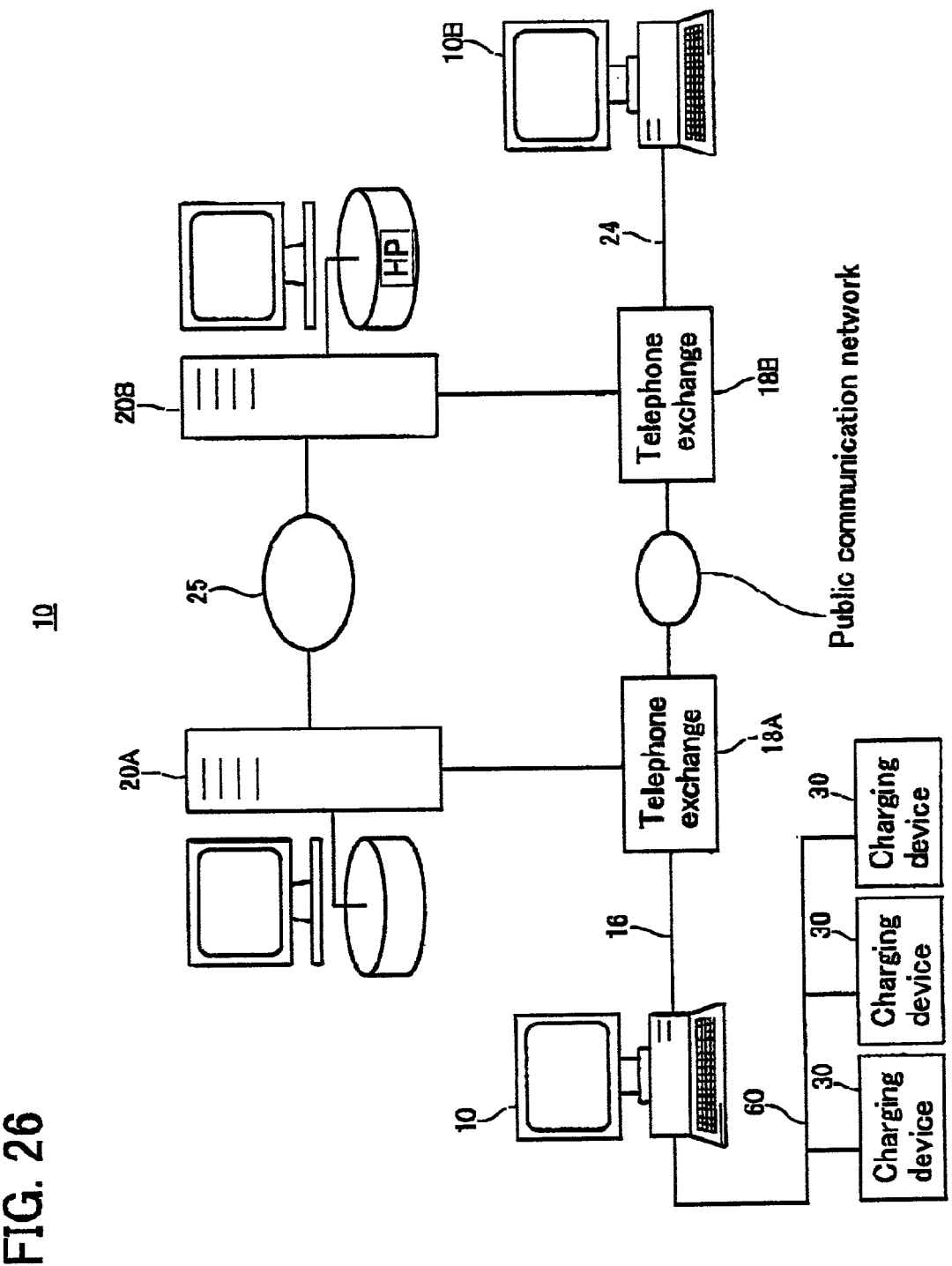
FIG. 26 shows a fifth representative arrangement for managing a plurality of charging devices.

FIG. 26 shows a fifth representative embodiment for managing charging devices, as well as a technique for updating battery charging characteristics. In the first representative embodiment, computer 10 was installed at the production line and was used to manage the charging devices. However, in the fifth representative embodiment, the charging devices on the assembly line may be centrally managed via the Internet using a computer installed another location.

Thus, in the fifth representative embodiment, computer 10 is disposed at the assembly line and is connected to telephone exchange 18A via telephone line 16. Telephone exchange 18A may be connected to server 20A, which may be connected to server 20B via dedicated high-speed line 25. The server 20B may be connected to the respective charging devices 30 and computer 10B, which computer 10B may be located at another location (e.g., at the office of the battery manufacturer), via line 24 and telephone exchange 18B. Computer 10B may update the control details for managing charging operations. Thus, the fifth representative embodiment provides the advantage that the charging devices can be managed according to the latest developments in battery charging techniques without the need to replace the charging devices and/or the battery packs. That is, updated information can be easily supplied to the charging devices in order to replace obsolete charging control programs.

Naturally, the present teachings are not limited to any particular battery charging technique or battery pack design and a variety of battery charging techniques known in the art may be utilized with the present teachings. For example, the battery charging techniques and battery pack designs shown in U.S. Pat. Nos. 6,075,347, 6,124,698, 6,191,554, 6,191, 560, 6,204,640, 6,204,641, 6,225,786, 6,229,280, 6,275,009, 6,278,261, 6,346,793 and 6,362,600, U.S. patent application Ser. Nos. 09/828,314 and 09/707,101, European Patent Publication No. 0 994 523 and Japanese Patent Publication No. 2001-143768 may be utilized with the present teachings. These patents and published patent applications disclose battery charging techniques that, generally speaking, involve detecting the battery temperature of rechargeable batteries using a temperature sensor and increasing or decreasing the charging current based upon the detected battery temperatures. In addition, these battery pack designs generally include shielding the battery cells from the forced air that flows through the battery pack in order to cool the battery cells during recharging. Moreover, other charging techniques may be utilized with the present teachings, such as the charging techniques described for example in U.S. Pat. Nos. 5,550,453 5,627,451, 5,945,803 and 6,008,628 and European Patent Publication No. 966089. A person of skill in the art will immediately recognize the advantages of combining the present teachings with one or more of the teachings of the above-mentioned patents and patent applications and all of these patents and patent applications are hereby incorporated by reference if fully disclosed herein.

The invention claimed is:

1. A method for managing a plurality of charging devices that are connected to a computer via a network, wherein the plurality of charging devices are used in at least two different work areas, at least some of the usage environments of each of the work areas being different from the other work areas, the method comprising:
storing the work area of each charging device within the computer;
transmitting charging information from a charging device to the computer via the network when a battery pack is mounted on the charging device, wherein the charging information includes an identifier of the charging device on which the battery pack is mounted;
identifying which of the work areas the charging device on which the battery pack is mounted based on the charging information transmitted from the charging device to the computer via the network;
selecting charging control instructions based on at least the work area of the charging device identified by the computer;
transmitting the charging control instructions from the computer to the charging device via the network; and
charging the mounted battery pack by the charging device based on the charging control instructions transmitted from the computer to the charging device via the network.

2. A method as in claim 1, wherein the charging control instructions comprise information that indicates the result of the selection made by the computer from available options for optimal charging based on the charging information.

3. A method as in claim 1, wherein the charging control instructions comprise parameters for selecting an optimal charging-current value.

4. A method as in claim 1, wherein the charging control instructions comprise a charge control map that includes optimal charging-current values.

5. A method as in claim 1, wherein the computer directly controls the charging operation performed by the charging devices by transmitting the charging control instructions.

6. A method as in claim 1, wherein the plurality of charging devices are classified into at least two different groups according to the usage environment of the respective charging devices, and the charging control instructions differ for each group.

7. A method for managing a plurality of charging devices that are connected to a computer via a network, wherein the plurality of charging devices are used in at least two different work areas, at least some of the usage environments of each of the work areas being different from the other work areas, the method comprising:
storing the work area of each charging device within the computer;
transmitting charging information from a charging device to the computer via the network when a battery pack is mounted on the charging device, wherein the charging information includes an identifier of the charging device on which the battery pack is mounted and an identifier of the mounted battery pack;
identifying the work area of the charging device on which the battery pack is mounted based on the charging information transmitted from the charging device to the computer via the network;
determining whether the mounted battery pack requires a refresh operation based on the charging information transmitted from the charging device to the computer via the network, and
transmitting a refresh instruction from the computer to the charging device having the mounted battery pack via the network, when the computer determines that the mounted battery pack requires a refresh operation.

8. A method for managing a plurality of charging devices that are connected to a computer via a network, comprising:
transmitting charging information from a charging device to the computer via the network when a battery pack is mounted on the charging device;
determining the total number of charging devices and battery packs currently in operation by the computer;
calculating an optimal number of charging devices to be utilized based on the charging information transmitted from the charging device to the computer via the network; and
notifying an operator of the optimal number of charging devices.

9. A method for managing a plurality of charging devices that are connected to a computer via a network, comprising:
transmitting charging information from a charging device to the computer via the network when a battery pack is mounted on the charging device;
determining the total number of charging devices and battery packs currently in operation by the computer;
calculating an optimal number of battery packs to be utilized based on the charging information transmitted from the charging device to the computer via the network; and
notifying an operator of the optimal number of battery packs.

10. A charging device, comprising:
means for storing an identifier of the charging device;
a battery pack mount having terminals for connecting to a battery pack;
means for supplying charging current to the battery pack via the terminals;
a communication port that communicates information to a computer via a network; and
a processor for transmitting the identifier of the charging device from the communication port to the computer via the network when the battery pack is mounted on the charging device, wherein the processor reads an identifier of a battery pack and battery voltage of the battery pack from the battery pack mounted on the battery pack mount and transmits said identifier and battery voltage to the computer via the network; and
a memory that stores at least one charge control map, wherein the processor controls the charging current supplying means based on the at least one charge control map.

11. A charging device as in claim 10, wherein the processor receives at least one charge control map from the computer via the network and store the received charge control map in the memory.

12. An apparatus, comprising:
a plurality of charging devices, wherein the plurality of charging devices are used in at least two different work areas, at least some of the usage environments of each of the work areas being different from the other work areas, wherein each charging device comprises a battery pack mount that receives a battery pack, wherein each charging device generates charging information including an identifier of the charging device when the battery pack is mounted on the battery pack mount, and wherein each charging device charges the battery pack mounted on the battery pack mount based on charging control instructions transmitted to the charging device via a network; and
a computer communicating with the plurality of charging devices via a network, wherein the computer stores the work area of each charging device, wherein the computer receives the charging information from the charging device via the network, and generates charging control instructions based on at least the work area of the charging device that is identified based on the charging information transmitted from the charging device via the network, wherein the computer transmits the charging control instructions to the charging device via the network.

13. An apparatus as in claim 12, wherein the computer comprises means for selecting an optimal charging control program based on the charging information transmitted from the charging device via the network.

14. An apparatus as in claim 12, wherein the computer comprises means for generating parameters for selecting an optimal charging-current value.

15. An apparatus as in claim 12, wherein the computer comprises means for generating a charge control map that includes optimal charging-current values.

16. An apparatus as in claim 12, wherein the computer controls the charging operation performed by the charging device by transmitting the charging control instructions.

17. An apparatus as in claim 12, wherein the plurality of charging devices are classified into at least two different groups according to the usage environment of the respective charging devices, and the charging control instructions differ for each group.

18. An apparatus, comprising:
a plurality of charging devices, wherein the plurality of charging devices are used in at least two different work areas, at least some of the usage environments of each of the work areas being different from the other work areas, wherein each charging device comprises a battery pack mount that receives a battery pack, wherein each charging device generates a charging device identifier and a battery pack identifier when a battery pack is mounted on the charging device, and
a computer communicating with the plurality of charging devices via a network, wherein the computer stores the work area of each charging device, wherein the computer receives the charging device identifier and the battery pack identifier from the charging device via the network, the computer further identifying the work area of the charging device based on the charging device identifier transmitted from the charging device via the network, and determining whether a refresh operation is required based on the battery pack identifier transmitted from the charging device via the network, the computer transmitting a refresh instruction to the charging device via the network, and
means for informing an operator to remove the mounted battery pack from the charging device and perform the refresh operation on the removed battery pack upon receipt of the refreshing instruction.

19. An apparatus, comprising:
a plurality of charging devices, wherein each charging device comprises a battery pack mount arranged and constructed to receive a battery pack, wherein each charging device is arranged and constructed to generate battery identification information based upon a mounted battery pack, and
a computer communicating with the plurality of charging devices via a network, wherein the computer is arranged and constructed to (a) determine the total number of charging devices and battery packs currently in operation, (b) calculate an optimal number of charging devices to be utilized based upon the charging information and (c) notify an operator of the optimal number of charging devices.

20. An apparatus, comprising:
a plurality of charging devices, wherein each charging device comprises a battery pack mount arranged and constructed to receive a battery pack, wherein each charging device is arranged and constructed to generate battery identification information based upon a mounted battery pack, and
a computer communicating with the plurality of charging devices via a network, wherein the computer is arranged and constructed to (a) determine the total number of charging devices and battery packs currently in operation, (b) calculate an optimal number of battery packs to be utilized based upon the charging information and (c) notify an operator of the optimal number of battery packs.

21. An apparatus, comprising:
a plurality of charging devices, wherein each charging device comprises a battery pack mount for receiving a battery pack, wherein each charging device generates battery pack identification information based upon a mounted battery pack, and
a computer communicating with the plurality of charging devices via a network, wherein the computer (a) determines the total number of charging devices and battery packs currently in operation, (b) calculates an optimal number of charging devices to be utilized based upon the charging information and (c) notifies an operator of the optimal number of charging devices.

22. An apparatus, comprising:
a plurality of charging devices, wherein each charging device comprises a battery pack mount for receiving a battery pack, wherein each charging device generates battery pack identification information based upon a mounted battery pack, and
a computer communicating with the plurality of charging devices via a network, wherein the computer (a) determines the total number of charging devices and battery packs currently in operation, (b) calculates an optimal number of battery packs to be utilized based upon the charging information and (c) notifies an operator of the optimal number of battery packs.

* * * * *